United States Patent
Nair et al.

(10) Patent No.: US 8,935,160 B2
(45) Date of Patent: Jan. 13, 2015

(54) SYSTEMS AND METHODS FOR FRAME SYNCHRONIZATION

(75) Inventors: Sujit Nair, San Diego, CA (US); Sree B. Amirapu, Lynchburg, VA (US); Eugene H. Peterson, Lynchburg, VA (US)

(73) Assignee: Harris Corporation, Melbourne, FL (US)

( * ) Notice: Subject to any disclaimer, the term of this patent is extended or adjusted under 35 U.S.C. 154(b) by 761 days.

(21) Appl. No.: 13/224,622

(22) Filed: Sep. 2, 2011

(65) Prior Publication Data

US 2013/0060565 A1 Mar. 7, 2013

(51) Int. Cl.
| | |
|---|---|
| *G10L 21/00* | (2013.01) |
| *G10L 21/02* | (2013.01) |
| *G10L 19/02* | (2013.01) |
| *G10L 19/00* | (2013.01) |
| *G10L 21/04* | (2013.01) |
| *H04L 7/04* | (2006.01) |
| *H04L 1/00* | (2006.01) |
| *H04L 1/20* | (2006.01) |
| *H04B 7/26* | (2006.01) |

(52) U.S. Cl.
CPC ............. *H04L 7/048* (2013.01); *H04L 1/0047* (2013.01); *H04L 1/203* (2013.01); *H04B 7/2643* (2013.01)
USPC ........... 704/228; 704/229; 704/500; 704/503; 704/504

(58) Field of Classification Search
CPC ......... G10L 19/005; H04L 1/20; H04L 1/201; H04L 1/203; H04L 7/048; H04L 7/04; H04L 1/0047; H04L 7/041
See application file for complete search history.

(56) References Cited

U.S. PATENT DOCUMENTS

| | | | |
|---|---|---|---|
| 5,128,792 A | 7/1992 | Teich et al. | |
| 5,140,611 A | 8/1992 | Jones et al. | |
| 5,140,620 A * | 8/1992 | Woodward | 375/375 |
| 5,179,570 A | 1/1993 | Imran | |
| 5,434,905 A | 7/1995 | Maeda et al. | |
| 5,881,053 A | 3/1999 | Kimball | |
| 6,081,229 A | 6/2000 | Soliman et al. | |
| 6,456,606 B1 * | 9/2002 | Terasawa | 370/331 |
| 6,535,502 B1 | 3/2003 | Brink | |

(Continued)

OTHER PUBLICATIONS

Tia Standard, "Project 25, Phase 2 Two-Slot TDMA Media Access Control Layer Description". TIA-102.BBAC, Dec. 2010.

(Continued)

*Primary Examiner* — Eric Yen
(74) *Attorney, Agent, or Firm* — Robert J. Sacco, Esq.; Fox Rothschild LLP

(57) ABSTRACT

Systems (1600) and methods (1500) for frame synchronization. The methods involve: extracting bit sequences $S_0$ and $S_1$ from a Bit Stream ("BS") of a Data Burst ("DB"); decoding $S_0$ and $S_1$ to obtain decoded bit sequences $S'_0$ and $S'_1$; using $S'_0$ and $S'_1$ to determine Bit Error Rate ("BER") estimates (516, 518); combining the BER estimates to obtain a combined BER estimate; modifying $S_0$ and $S_1$ so that each includes at least one bit of BS which is not included in its current set of bits and so that it is absent of at least one of the bits in the current set of bits; iteratively repeating the decoding, using, combining and modifying steps to obtain more combined BER estimates; analyzing the combined BER estimates to identify a minimum combined BER estimate; and using the minimum combined BER estimate to determine a location of a vocoder voice frame within DB.

22 Claims, 18 Drawing Sheets

(56) References Cited

U.S. PATENT DOCUMENTS

| | | |
|---|---|---|
| 7,046,700 B1 * | 5/2006 | Roberts et al. ............... 370/535 |
| 7,061,970 B2 | 6/2006 | Reed et al. |
| 7,155,016 B1 | 12/2006 | Betts et al. |
| 2003/0165134 A1 | 9/2003 | Low et al. |
| 2004/0075535 A1 * | 4/2004 | Propp et al. ............... 340/310.01 |
| 2004/0136288 A1 * | 7/2004 | Gushima et al. ........... 369/47.34 |
| 2006/0161370 A1 * | 7/2006 | Jiang et al. .................... 702/107 |
| 2008/0200136 A1 | 8/2008 | Taylor |
| 2010/0222075 A1 * | 9/2010 | Miura ........................ 455/456.1 |
| 2011/0176590 A1 * | 7/2011 | Banerjee et al. .............. 375/224 |
| 2011/0255377 A1 * | 10/2011 | Abe ............................... 368/47 |

OTHER PUBLICATIONS

Kanemasu, Melissa. "Golay Codes", MIT International Journal of Mathematics, pp. 95-100, 1999.

Truong, T.K., et al., "Decoding of 1/2-Rate (24,12) Golay Codes", TDKA Progress Report 42-97, Jan.-Mar. 1989, pp. 202-207.

Truong, T.K, et al. "A Simplified Procedure for Decoding the (23,12) and (24,12) Golay Codes". TDA Progress Report 42-96, Oct.-Dec. 1988; pp. 49-58.

* cited by examiner

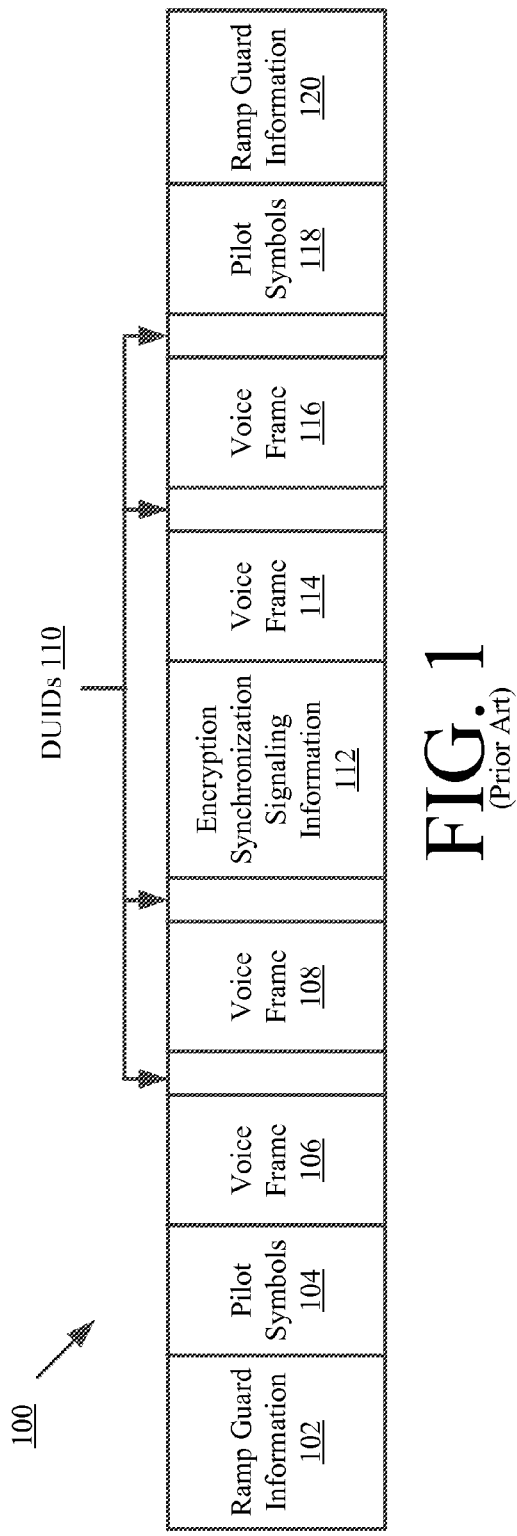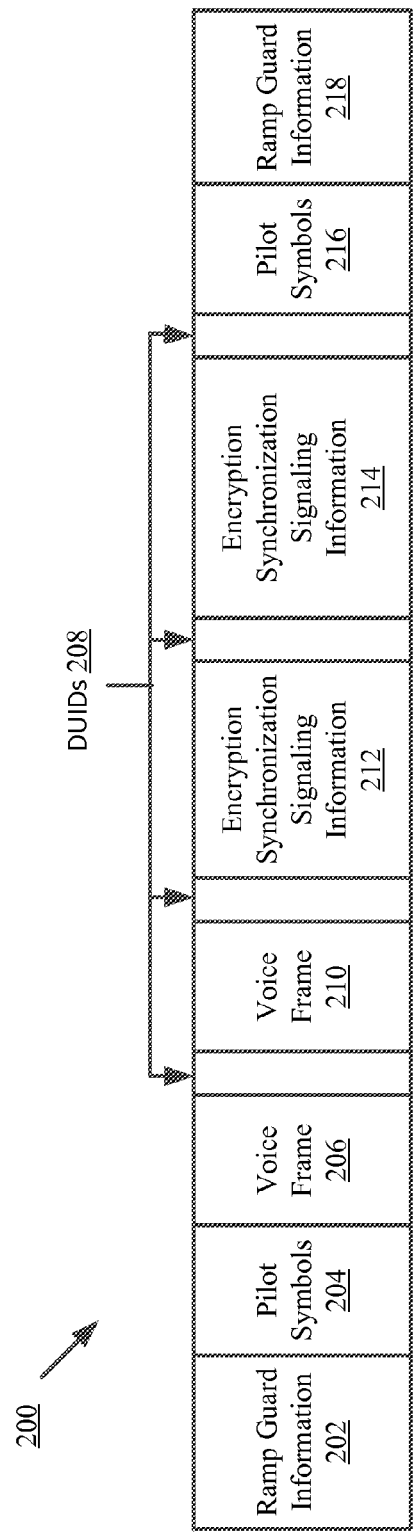
FIG. 1
(Prior Art)
FIG. 2
(Prior Art)

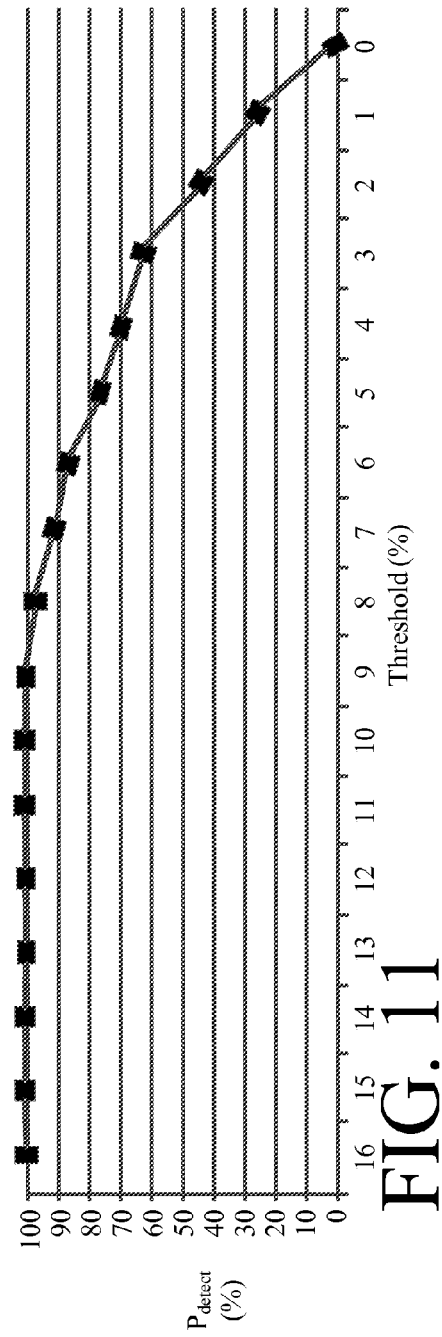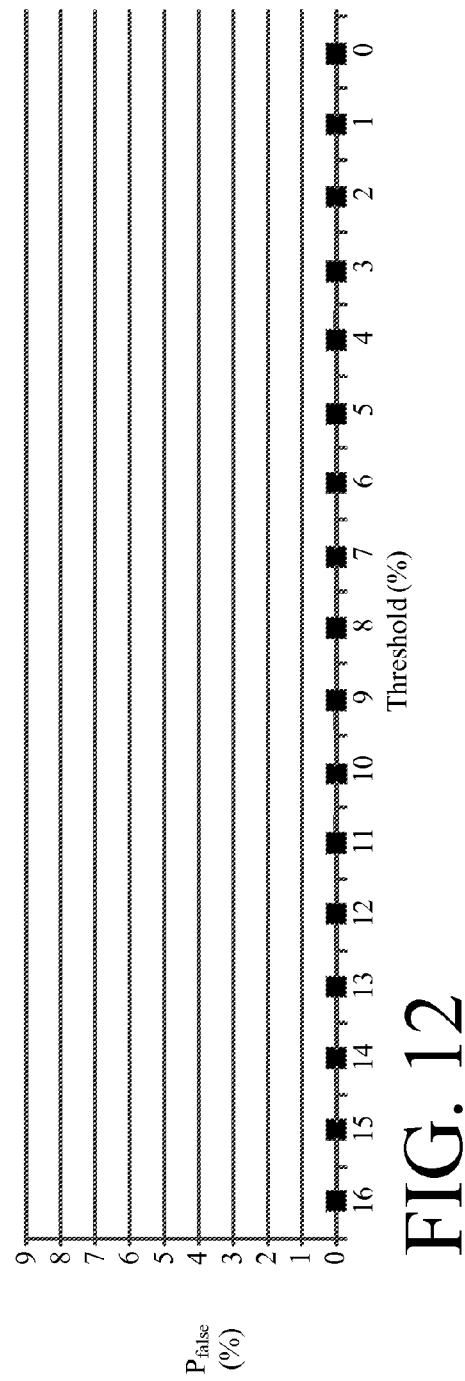

SYSTEMS AND METHODS FOR FRAME SYNCHRONIZATION

BACKGROUND OF THE INVENTION

1. Statement of the Technical Field

The invention concerns communication systems. More particularly, the invention concerns communications systems implementing methods for frame synchronization.

2. Description of the Related Art

There are many conventional digital communication systems known in the art. The digital communication systems typically comprise communication devices (e.g., radios) and Fixed Network Equipment ("FNE"). The communication devices are each communicatively coupled to the FNE via a Radio Frequency ("RF") link. The RF link is established by sending a digitally modulated signal from a communication device and receiving the digitally modulated signal at the FNE.

The digital communication systems often employ Time Division Multiplexing ("TDM"). TDM is a type of digital multiplexing in which two or more signals or data streams are transferred simultaneously as sub-channels in one communication channel. The communication channel is divided into timeslots for each of the sub-channels. During operation, data for a first sub-channel is transmitted during odd numbered timeslots (e.g., a first timeslot and a third timeslot). Data for a second sub-channel is transmitted during even numbered timeslots (e.g., a second timeslot and a fourth timeslot).

In these digital communication systems, one or more short transmission data bursts are assigned to each timeslot. A data burst typically consists of various types of information. For example, as shown in FIG. 1, an inbound 4V data burst 100 of a Project 25 ("P25") Phase 2 Time Division Multiple Access ("TDMA") based communication system consists of ramp guard information 102, 120, pilot symbols 104, 118, four (4) voice frames 106, 108, 114, 116, Encryption Synchronization Signaling ("ESS") information 112 and Data Unit Identifiers ("DUIDs") 110. In contrast, as shown in FIG. 2, an inbound 2V data burst 200 of a P25 Phase 2 TDMA based communication system consists of ramp guard information 202, 218, pilot symbols 204, 216, DUIDs 208, two (2) voice frames 206, 210 and ESS information 212, 214. The ramp guard information is used to prevent overlap between transmitting frame timing and receiving frame timing. The voice frames include digital voice data.

Before the processing of the data bursts begins, the FNE needs to synchronize symbol timing and frame timing with the transmitting communication device. Symbol synchronization is performed to find a correct down sampling instant. Frame synchronization is performed to determine the structure of a frame, i.e., to identify the location of frames within a voice burst sequence. The synchronization is performed to ensure that the FNE knows exactly where a data stream begins in a received RF signal and where the start/end of a TDM frame is within the data stream. The synchronization is typically achieved using a known synchronization pattern. The synchronization pattern is transmitted in an RF signal from the communication device prior to the transmission of data bursts. At the FNE, the synchronization pattern is located within the received RF signal. Once the synchronization pattern has been located, the FNE performs operations to establish symbol and frame synchronization with the communication device. Although the utilization of a known pattern enables symbol and frame synchronization between the communication device and FNE, it results in an inefficient utilization of bandwidth since the synchronization pattern does not include any user and/or control data.

The conventional digital communication systems also typically employ a late call entry mechanism for the FNE that misses a normal call entry, i.e., that misses the known synchronization pattern. For example, a P25 Phase 2 TDMA based communication system employs a technique in which Slow Associated Control CHannel ("SACCH") information is used to facilitate timing synchronization between a communication device and an FNE which is trying to enter a call late. This SACCH technique will be described below in relation to FIG. 3.

As shown in FIG. 3, inbound communications 300 include a known synchronization pattern 302 and at least two ultraframes 350. The phrase "inbound communication" as used here refers to a communication transmitted from a transmitting communication device to the FNE. The known synchronization pattern 302 can be included in one or more Media Access Control ("MAC") Push-To-Talk ("PTT") Protocol Data Units ("PDUs"), which are not shown in FIG. 3. A first ultraframe 350 includes superframe data 304, 308, 312, 316, inbound talker SACCH data 306, 310, 314 and listener SACCH data 318. A second ultraframe 350 includes superframe data 320, inbound talker SACCH data 322 and other data (not shown in FIG. 3). The superframe data 304, 308, 312, 320 includes voice data that is being communicated from a first communication device to the FNE. The SACCH data 306, 310, 314, 322 includes synchronization information communicated from the first communication device to the FNE that is useful for facilitating late call entry. The superframe data 316 includes data (e.g., a request to join an existing call) transmitted from a second communication device to the FNE. The SACCH data 318 includes call specific information communicated from the second communication device to the FNE.

As noted above the synchronization pattern 302 is used to establish frame synchronization between a transmitting communication device and the FNE during a normal call entry. Once the synchronization has been established via the synchronization pattern 302, the FNE does not need to perform additional frame synchronization operations for subsequently received TDM/TDMA frames. Still, the FNE may monitor the inbound talker SACCH data to ensure that the frame synchronization is maintained.

However, if the FNE misses the synchronization pattern 302 and/or MAC PTT PDU(s), then the FNE has no idea where the voice data is in a received RF signal. As such, it must perform a late call entry process to establish frame synchronization with the transmitting communication device. The late call entry process involves relying on synchronization information contained in inbound talker SACCH data. In this regard, the FNE must wait for an inbound talker SACCH data (e.g., SACCH data 306) and use synchronization information contained therein to establish frame synchronization with the transmitting communication device. In this scenario, the frame synchronization takes approximately three hundred sixty (360) milliseconds (i.e., the duration of the superframe data 304 and the inbound talker SACCH data 306) and the audio information of superframe data 304 is lost.

If the FNE receives a request from another communication device to join the existing call after data components 302-314 have been transmitted from the transmitting communication device, then it must wait for the inbound talker SACCH data 322 to establish frame synchronization with the transmitting communication device. In this scenario, the frame synchronization takes approximately seven hundred twenty (720)

milliseconds (i.e., the duration of superframes 316, 320, listener SACCH 318 and inbound talker SACCH 322) and the audio information of superframe data 320 is lost. An average call duration is typically around two (2) seconds. Therefore, loss of the audio information of superframe data 320 results in an approximately a thirty three percent (33%) total loss of audio information.

SUMMARY OF THE INVENTION

Embodiments of the present invention concern implementing systems and methods for frame synchronization between a transmitting device and a receiving device. The method embodiments involve selecting and extracting bit sequences $S_0$ and $S_1$ from a bit stream of a received data burst. The bit sequences $S_0$ and $S_1$ are different from each other, i.e., they include different sets of bits contained in the data stream. The bit sequences $S_0$ and $S_1$ are then decoded. The results of the decoding process are referred to herein as decoded bit sequences $S'_0$ and $S'_1$. The decoded bit sequences $S'_0$ and $S'_1$ are used to determine Bit Error Rate ("BER") estimates for a vocoder voice frame contained within the data burst. The BER estimates are combined to obtain a combined BER estimate. Thereafter, each of the bit sequences $S_0$ and $S_1$ is modified so that it includes at least one bit of the bit stream which is not included in its current set of bits and so that it is absent of at least one bit contained within the current set of bits.

Subsequently, the decoding, using, combining and modifying steps are iteratively repeated to obtain more combined BER estimates for the vocoder voice frame. The combined BER estimates are then analyzed to identify a minimum combined BER estimate thereof. The minimum combined BER estimate is used to determine a location of the vocoder voice frame within the data burst. For example, a start bit of the vocoder voice frame is determined to comprise a bit contained in the bit sequence $S_0$ which is associated with the minimum combined BER estimate. Similarly, an end bit of the vocoder voice frame is determined to comprise a bit contained in the bit sequence $S_1$ which is associated with the minimum combined BER estimate. In some embodiments, the end bit determination is made based on a known length of the bit sequence $S_1$. Embodiments of the present invention are not limited in this regard.

According to aspects of the present invention, at least one of the BER estimates is determined by: comparing the bit sequence $S_0$ or $S_1$ with the respective one of the decoded bit sequences $S'_0$ and $S'_1$ to identify bit values of the bit sequence $S_0$ or $S_1$ which were changed during the decoding process; counting the number of bit values which were changed during the decoding process; and/or dividing the number by a total number of bits contained in a respective one of the bit sequences $S_0$ and $S_1$. At least one of the combined BER estimates is obtained by: adding the BER estimates together; or by computing an average of the BER estimates. The minimum combined BER estimate is identified by: selecting a combined BER estimate from the combined BER estimates that has the lowest value; and/or selecting a combined BER estimate from the first combined BER estimate and the plurality of second BER estimates that has a value less than a threshold. The threshold is selected to maximize a probability of detection of a correct location of the vocoder voice frame within the data burst and minimize a probability of a false detection of the correct location of the vocoder voice frame If none of the combined BER estimates has a value that is less than the threshold, then the bit stream of the data burst is discarded.

Other method embodiments involve determining a plurality of first combined BER estimates for a first vocoder voice frame and a plurality of second combined BER estimates for a second vocoder voice frame. Each of the first combined BER estimates are combined with a respective one of the second combined BER estimates to obtain a plurality of third combined BER estimates. The third combined BER estimates are analyzed to identify a lowest combined BER estimate therefrom. The lowest combined BER estimate is used to determine the locations of the first and second vocoder voice frames within a data burst.

Each of the first and second combined BER estimates is determined by: extracting at least two different bit sequences $S_0$ and $S_1$ from a bit stream of the data burst; decoding the bit sequences $S_0$ and $S_1$ to obtain decoded bit sequences $S'_0$ and $S'_1$; using the decoded bit sequence $S'_0$ to determine a first BER estimate for a respective one of the first and second vocoder voice frames and the decoded bit sequence $S'_1$ to determine a second BER estimate for the respective one of the first and second vocoder voice frames; and combining the first and second BER estimates to obtain one of the first or second combined BER estimates.

BRIEF DESCRIPTION OF THE DRAWINGS

Embodiments will be described with reference to the following drawing figures, in which like numerals represent like items throughout the figures, and in which:

FIG. 1 is a schematic illustration of an inbound 4V data burst of a P25 Phase 2 TDMA based communication system.

FIG. 2 is a schematic illustration of an inbound 2V data burst of a P25 Phase 2 TDMA based communication system.

FIGS. 9, 11 and 13 are graphs plotting a probabilities of detection ("$P_{detect}$") versus threshold values that are useful for understanding the present invention.

FIGS. 10, 12 and 14 are graphs plotting probabilities of false detection ("$P_{false}$") versus threshold values that are useful for understanding the present invention.

DETAILED DESCRIPTION

Figure 3:
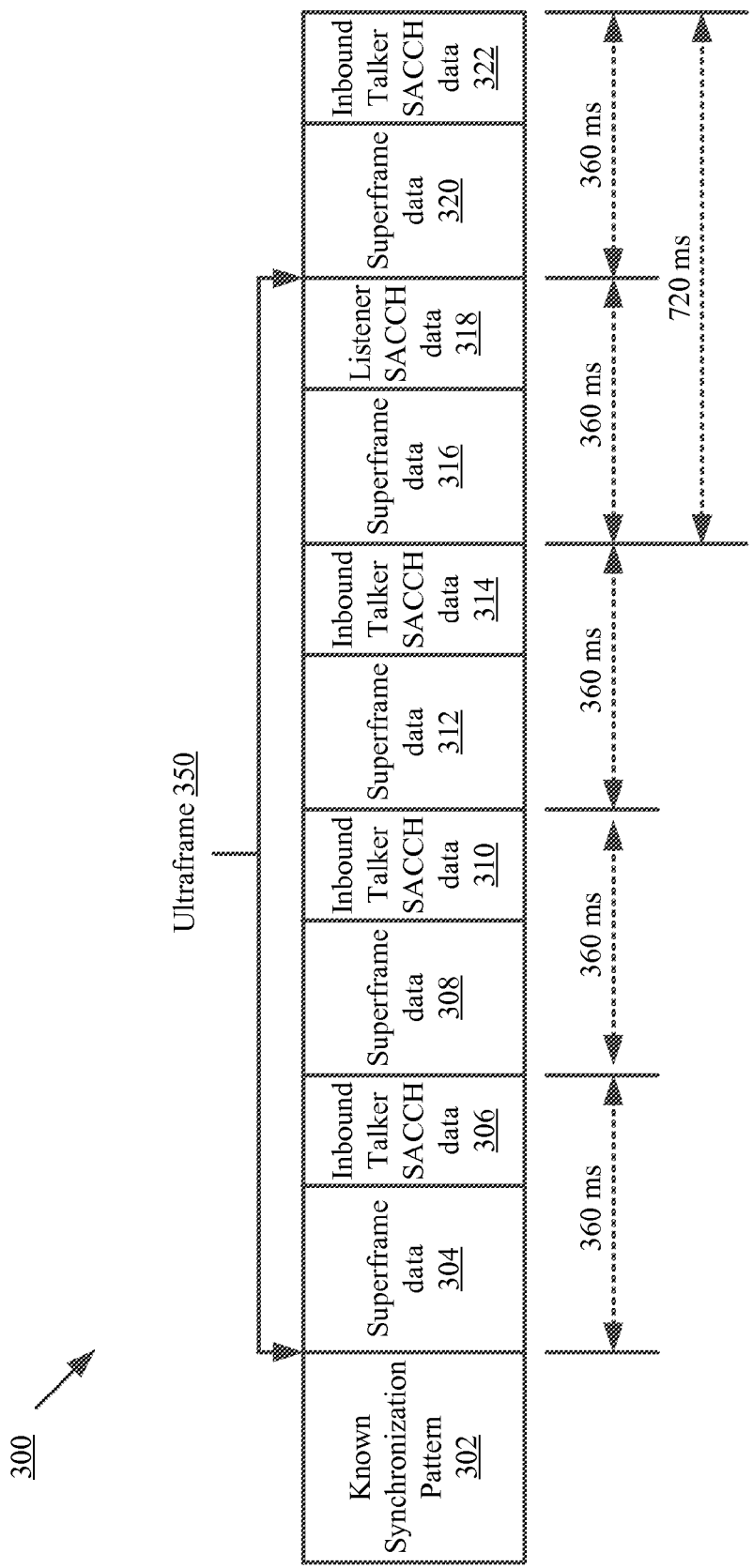
FIG. 3 is a schematic illustration of inbound communications in a P25 Phase 2 TDMA based communication system.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The present invention concerns implementing systems and methods for frame synchronization between a transmitting communication device and a receiving communication device (e.g., a base station) which is entering a call late. The implementing systems overcome various drawbacks of conventional communication systems employing conventional late call entry processes. For example, the implementing systems of the present invention have a late call entry time which is reduced as compared to that of conventional communication systems. Also in the implementing systems of the present invention, less audio information is lost during the performance of a late call entry process as compared to the amount of information that is lost during the performance of a conventional late call entry processes. The above described improvements of the present invention are at least partially due to the implementation of a novel method for frame synchronization between a transmitting communication device and a receiving communication device.

The method embodiments of the present invention generally involve using information contained in data bursts to help frame synchronize the receiving communication device with the transmitting communication device. The information includes, but is not limited to, Device Unique Identifiers ("DUIDs"), Received Signal Strength Indicators ("RSSIs"), pilot symbols (also known as reference symbols) and voice frames. A DUID specifies the type of a data burst (e.g., a MAC PTT PDU data burst, a 4V data burst, a 2V data burst or a SACCH data burst). An RSSI specifies the amount of power present in a received radio signal. Notably, the method embodiment reduces late call entry time and audio information loss as compared to those of conventional methods for timing synchronization. For example, in a P25 Phase 2 TDMA based communication system, a late entry time can be reduced from three hundred sixty (360) milliseconds to less than seventy five (75) milliseconds or from seven hundred twenty (720) milliseconds to less than ninety (90) milliseconds. The particularities of the method embodiments of the present invention will become more evident as the discussion progresses.

The present invention can be used in a variety of applications. Such applications include, but are not limited to, cellular communication system applications, TDM based communication system applications, TDMA based communication system application, P25 Phase 2 TDMA communication system applications and/or any other communication system applications in which the implementation of an improved late call entry process is desired. Concepts that are useful for understanding the present invention will be described below in relation to FIGS. 4-14. Exemplary method embodiments will be described below in relation to FIG. 15. Exemplary implementing system embodiments will be described below in relation to FIGS. 16-19.

Concepts that are Useful for Understanding the Present Invention

Figure 4:
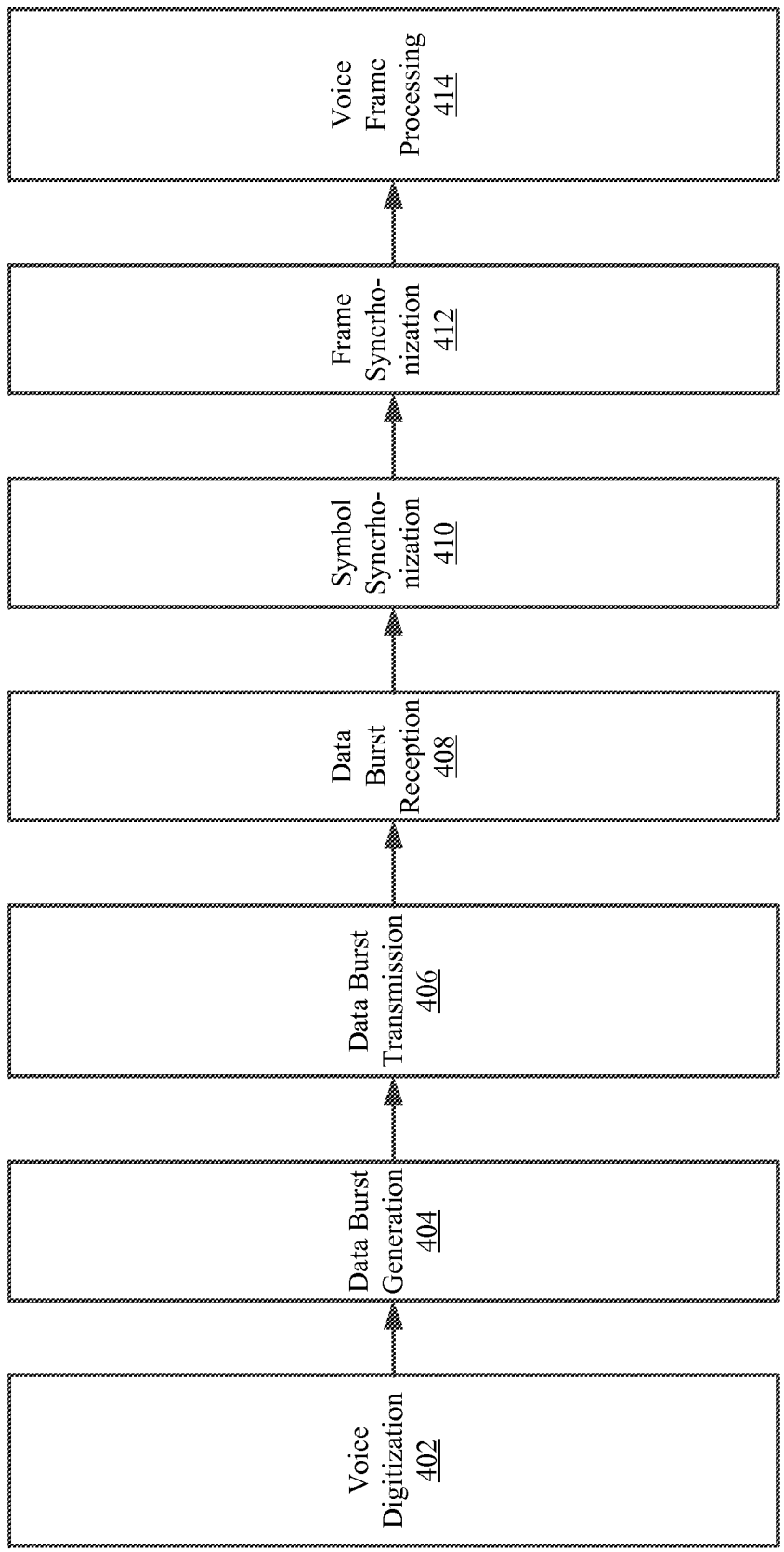
FIGS. 4-5 and 21 are conceptual diagrams that are useful for understanding exemplary frame synchronization processes of the present invention.
Figure 5:
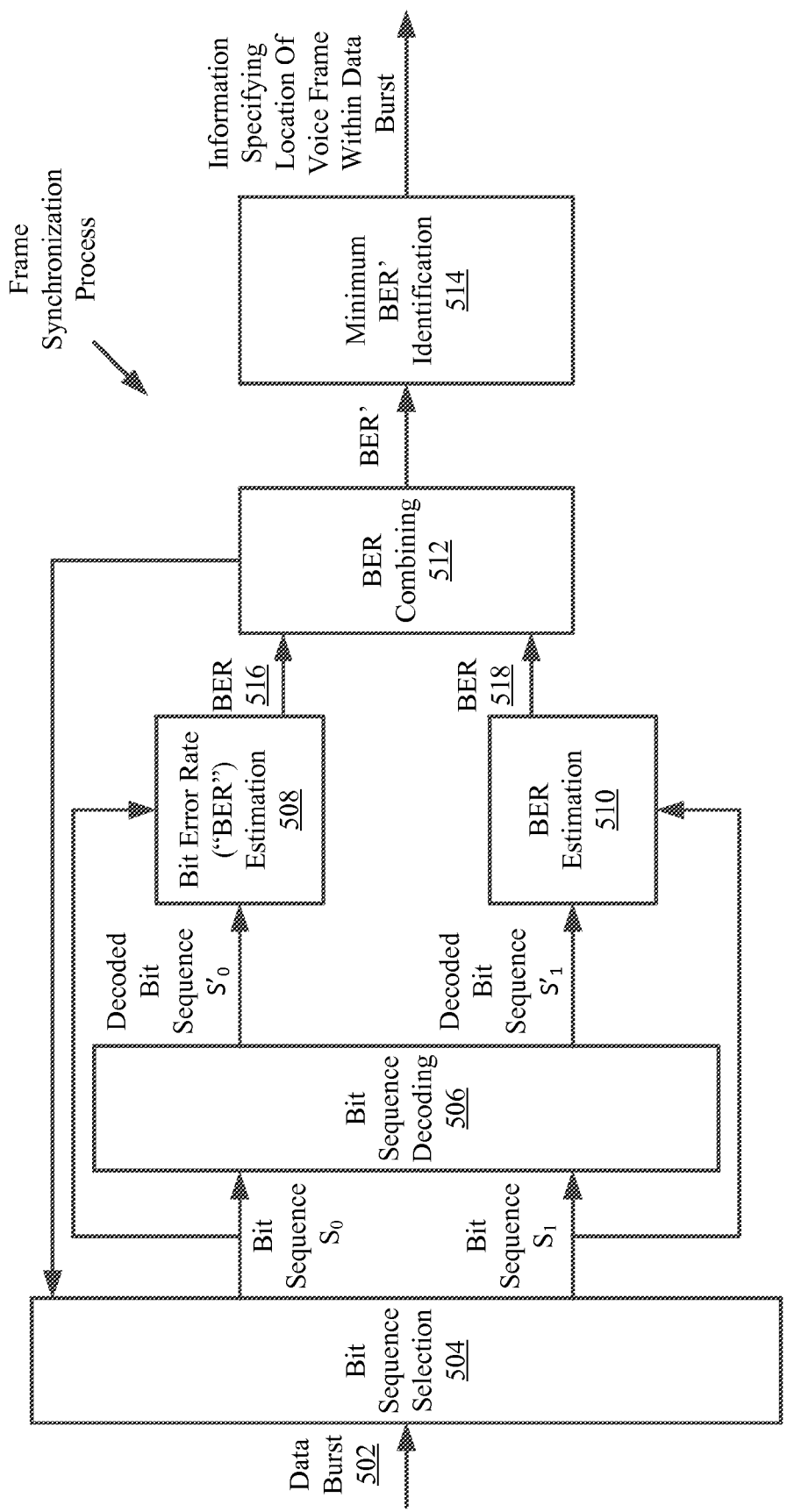
Figure 6:
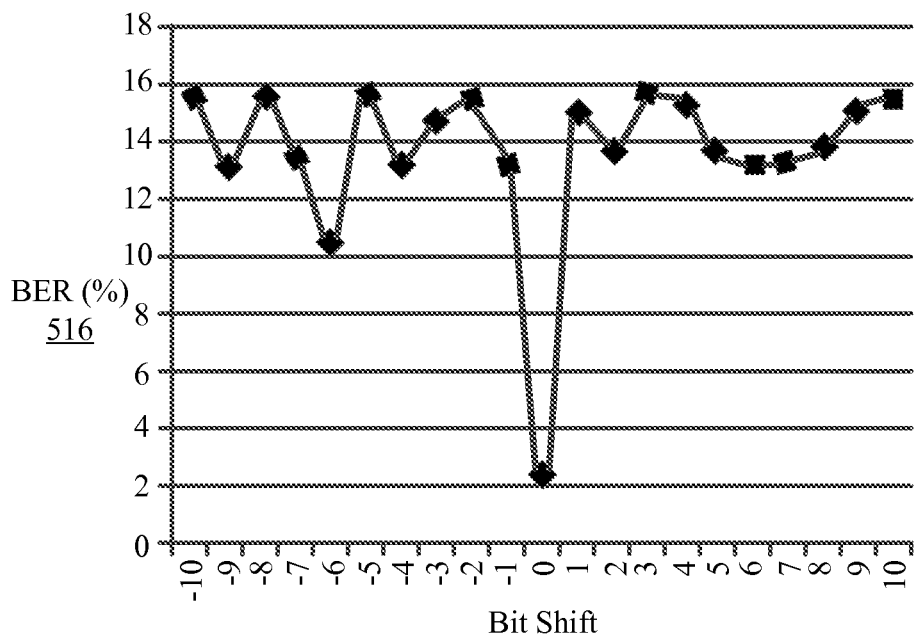
FIGS. 6-8 are graphs plotting Bit Error Rates ("BERs") versus bit shifts that are useful for understanding the present invention.
Figure 7:
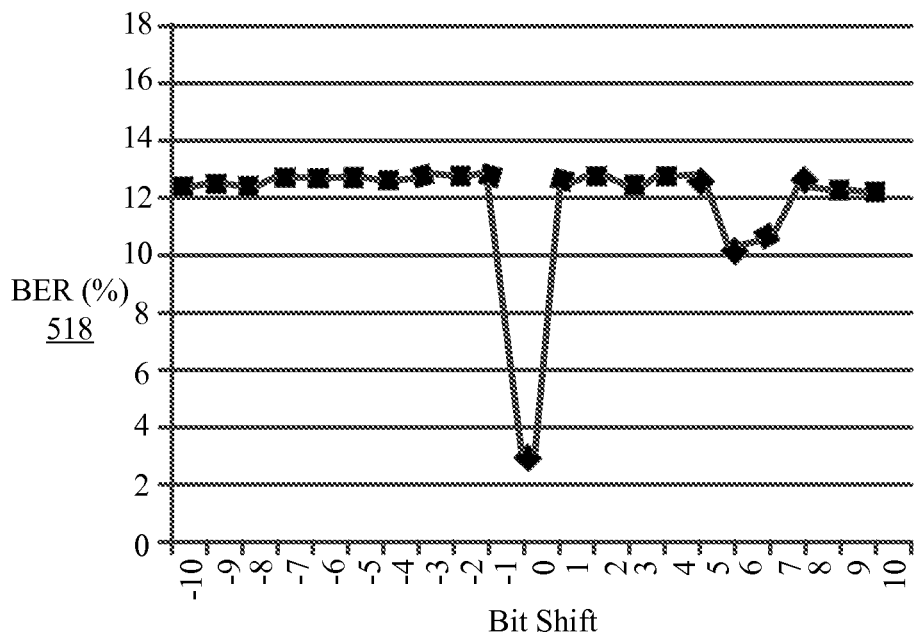
Figure 8:
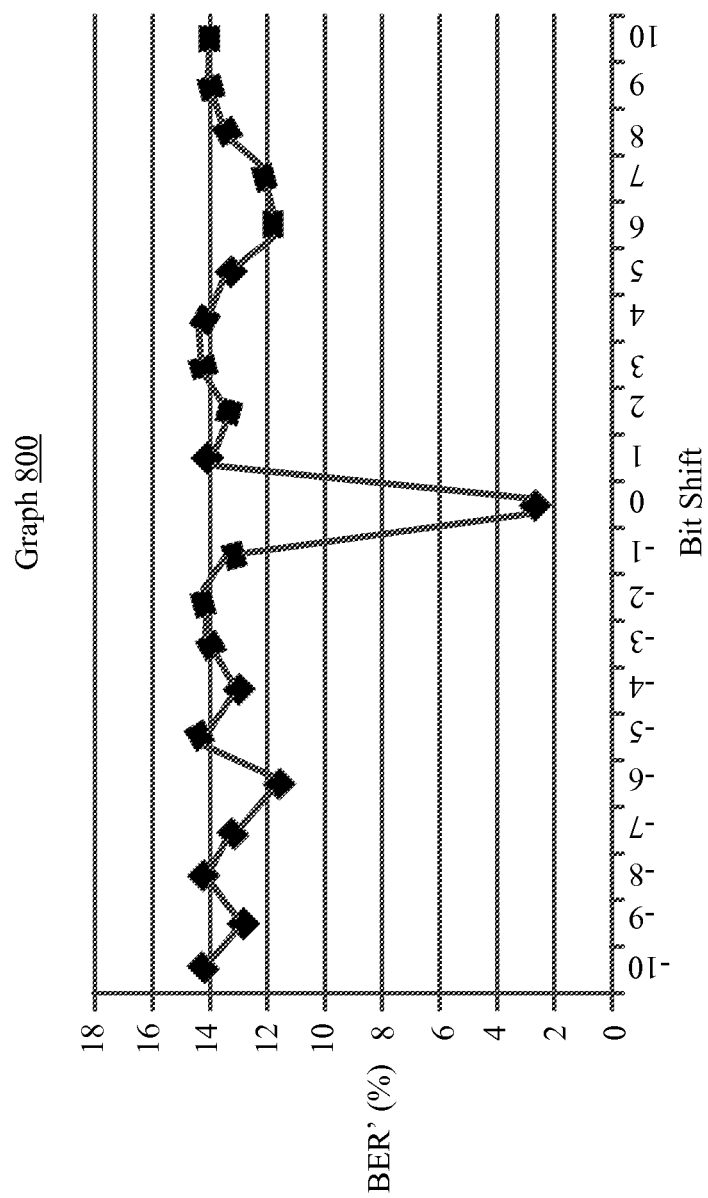
Figure 21:
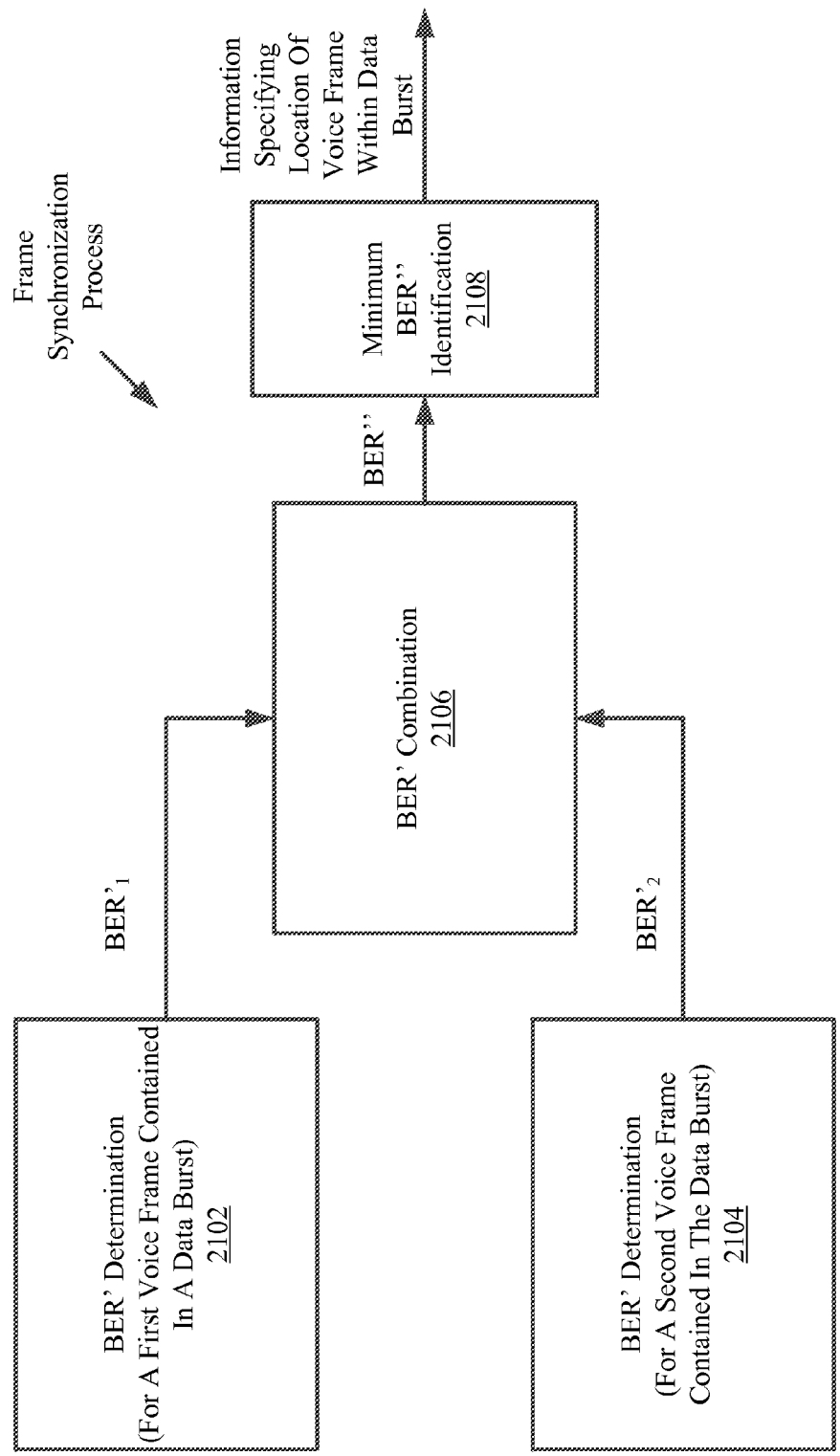

Referring now to FIGS. 4-5 and 21, there are provided conceptual diagrams that are useful for understanding exemplary synchronization processes of the present invention. As shown in FIG. 4, the synchronization processes begin with voice digitization 402 to reduce the bandwidth of voice signals. Methods for voice digitization are well known in the art, and therefore will not be described herein. Any such method of voice digitization can be used with the present invention without limitation. Still, it should be understood that the voice digitization is achieved using a vocoder configured to generate a plurality of vocoder voice frames by reducing "X" milliseconds of audio information to "Y" bits, where "X" and "Y" are integers. For example, a vocoder employing a Golay code reduces twenty (20) milliseconds of voice down to seventy two (72) bits. The seventy two (72) bits are then used to form a vocoder voice frame. Golay codes are well known in the art, and therefore will not be described herein. Embodiments of the present invention are not limited in this regard.

After the vocoder voice frames are obtained, data bursts are generated in processing step 404. The data bursts can include, but are not limited to, a P25 Phase II 4V data burst ("4V data burst") and/or a P25 Phase II 2V data burst ("2V data burst"). A schematic illustration of a 4V data burst 100 is shown in FIG. 1 and described above in the background section of this document. As shown in FIG. 1, the 4V data burst 100 comprises four (4) vocoder voice frames 106, 108, 114, 116 and other information 102, 104, 110, 112, 118, 120. A schematic illustration of a 2V data burst 200 is shown in FIG. 2 and described above in the background section of this document. As shown in FIG. 2, the 2V data burst 200 comprises two (2) vocoder voice frames 206, 210 and other information 202, 204, 208, 212, 214, 216, 218. Methods for generating data bursts are well known in the art, and therefore will not be described herein. Any such method for generating data bursts can be used with the present invention without limitation.

Subsequent to completing processing step 404, the data bursts are transmitted from a transmitting device to a receiving device in processing step 406. The transmitting device includes, but is not limited to, a radio (e.g., a radio that complies with the P25 Phase 2 standard). The receiving device includes, but is not limited to, fixed network equipment (e.g., a base station) or a radio (e.g., a radio that complies with the P25 Phase 2 standard).

In a next processing step 408, the data bursts are received at the receiving device. At the receiving device, processing steps 410-412 are performed. These processing steps 410-412 are performed to establish symbol and frame synchronization between the transmitting device and the receiving device. Symbol synchronization is performed to find a correct down sampling instant. Frame synchronization is performed to determine the structure of a data burst, i.e., to identify the location of vocoder voice frames within a data burst. Methods for establishing symbol synchronization are well known in the art, and therefore will not be described herein. Any such method for establishing symbol synchronization can be used with the present invention without limitation. Still, it should be noted that certain advantages can be obtained from using certain symbol synchronization methods. Such advantages include, but are not limited to, a reduction in the overall processing time of a subsequent frame synchronization process. The frame synchronization is achieved using a novel technique of the present invention. This novel technique for frame synchronization will be described below in relation to FIG. 5. After symbol and frame synchronization have been established, the voice frames of the data bursts are extracted from the data bursts and processed in processing step 414.

Referring now to FIG. 5, there is provided a conceptual diagram of a novel frame synchronization process that is useful for understanding the present invention. Notably, the frame synchronization process of FIG. 5 is for determining a location of a single vocoder voice frame. A method for simultaneously determining the locations for two (2) vocoder voice frames will be described below in relation to FIG. 21.

As shown in FIG. 5, the frame synchronization process begins with processing step 504. In processing step 504, two different bit sequences $S_0$ and $S_1$ are selected and extracted from a bit stream of a data burst. The bits sequences $S_0$ and $S_1$ are then decoded in processing step 506 to generate decoded bit sequences $S'_0$ and $S'_1$. Methods for decoding bit sequences are well known in the art, and therefore will not be described herein. Any such method for decoding bits sequences can be used with the present invention without limitation. Still, it should be understood that the decoding is achieved using a decoder.

According to embodiments of the present invention, the vocoder includes a (24,12) extended Golay decoder and a (23, 12) Modulated Golay decoder. Such Golay decoders are well known in the art, and therefore will not be described herein. Still, it should be understood that, in this scenario, the bit sequence $S_0$ comprises twenty four (24) bits from a data burst and is decoded by the (24,12) extended Golay decoder. The output of the (24,12) extended Golay decoder is a bit sequence $S'_0$ comprising twenty four (24) decoded bits. The bit sequence $S_1$ comprises twenty three (23) bits from a data burst and is decoded by the (23, 12) Modulated Golay decoder. The bits of sequence $S_1$ are different than the bits of sequence $S_0$. The output of the (23, 12) Modulated Golay decoder is a bit sequence $S'_1$ comprising twenty three (23) decoded bits. Embodiments of the present invention are not limited in this regard.

Referring again to FIG. 5, the decoded bit sequence $S'_0$ is used in processing step 508 to determine a BER estimate 516 for a single voice frame. Similarly, the decoded bit sequence $S'_1$ is used in processing step 510 to determine a BER estimate 518 for a single voice frame. In embodiments of the present invention, the BER estimate 516 is determined by comparing the first bit sequence $S_0$ with the first decoded bit sequence $S'_0$ to identify the bit values of the first bit sequence which were changed by the decoding process of processing step 506. The number of bit values changed by the decoding process are then counted. This number is then divided by the total number of bits contained in the first bit sequence. The result of the division operation represents the BER estimate 516. Embodiments of the present invention are not limited in this regard. For example, the number of bit values changed by the decoding process may present the BER estimate 516, rather than the result of the division operation. The BER estimate 518 is determined a substantially similar manner as the BER estimate 516.

The BER estimates are then combined in processing step 512 to obtain a combined BER estimate ("BER'"). BER' includes, but is not limited to, a sum of the BER estimates 516, 518 or an average of the BER estimates 516, 518. BER' is then stored in a data store.

Thereafter, a next iteration of processing steps 504, 506, 508, 510 and 512 is performed to obtain a BER' for a next set of bit sequences. A first one of the bit sequences used in the next iteration comprises all but one (1) of the bits contained in bit sequence $S_0$ used in the previous iteration. Similarly, a second one of the bit sequences used in the next iteration comprises all but one (1) of the bits contained in bit sequence $S_1$ used in the previous iteration. For example, if the bit sequence $S_0$ used in the previous iteration is defined as $\{bit_0, bit_1, bit_2, bit_3, bit_4, \ldots, bit_5, bit_{23}\}$, then the corresponding bit sequence used in the next iteration is $\{bit_1, bit_2, bit_3, bit_4, \ldots, bit_5, bit_{24}\}$. Likewise, if the bit sequence $S_1$ used in the previous iteration is defined as $\{bit_{29}, bit_{30}, bit_{31}, bit_{32}, bit_{33}, bit_{34}, \ldots, bit_{51}\}$, then the corresponding bit sequence used in the next iteration is $\{bit_{30}, bit_{31}, bit_{32}, bit_{33}, bit_{34}, \ldots, bit_{51}, bit_{52}\}$. Embodiments of the present invention are not limited in this regard.

Any number of iterations of processing steps 504, 506, 508, 510 and 512 can be performed in accordance with a particular application. For example, twenty one (21) iterations of processing steps 504, 506, 508, 510 and 512 are performed to determine the start location and/or end location of a single vocoder voice frame of a data burst. If the data burst includes two (2) or more vocoder voice frames, then the twenty one (21) iterations need to be performed for each vocoder voice frame. In this scenario, the start and/or end of a single vocoder voice frame is found at least partially by shifting the bits of a received data burst through the decoding process 506. The results of the decoding process 506 include twenty one (21) decoded sequences $S'_0$ and twenty one (21) decoded sequences $S'_1$. The forty two (42) decoded sequences are used to obtain twenty one (21) BERs 516 and twenty one (21) BERs 518. Plots for the twenty one (21) BER estimates 516, 518 versus bit shifts are provided in FIGS. 6 and 7. In the graph 600 of FIG. 6, the twenty one (21) BER estimates 516 for a single vocoder voice frame are plotted along the vertical axis of the graph 600 and the bit shift values are plotted along the horizontal axis of the graph 600. Similarly in the graph 700 of FIG. 7, the twenty one (21) BER estimates 518 for a single vocoder voice frame are plotted along the vertical axis of the graph 700 and the bit shift values are plotted along the horizontal axis of the graph 700. The graphs 600, 700 show the characteristics of the forty two (42) BER estimates 516, 518 for a single vocoder voice frame with various pre-defined bit shifts. Notably, the BER estimates 516, 518 have the lowest values when the bit shifts are zero (0) and when the correct bits of a data burst are processed in steps 506, 508, 510. The "correct bits" comprise bits of a data burst which include substantially all of the same bit values as the corresponding decoded bits. The respective BER estimates 516, 518 are then combined to obtain twenty one (21) combined BERs'. A plot for the twenty one (21) combined BERs' for a single voice frame versus bit shifts is provided in FIG. 8. Embodiments of the present invention are not limited in this regard.

Referring again to FIG. 5, a minimum BER' is identified in processing step 514 subsequent to the completion of the plurality of iterations of processing steps 504, 506, 508, 510 and 512. This identification is achieved by: selecting a BER' from a plurality of BERs' that has the lowest value; and/or selecting a BER' from a plurality of BERs' that has a value less than a threshold. The threshold can be employed to improve the probability of a detection and reduce the probability of a false detection of a start location of a vocoder voice frame within a data burst of a weak signal. In the threshold scenario, the data burst is discarded if a BER' does not have a value below the threshold. The manner in which a threshold is selected will be described below in relation to FIGS. 9-14. Still, it should be understood that the threshold is selected to maximize the probability of detection of the correct start location of a vocoder voice frame, and minimize the probability of a false detection of the correct start location of the vocoder voice frame. The bit sequences $S_0$ and $S_1$ which are associated with the selected BER' specify which bits in a data burst are the first bit of a vocoder voice frame and the last bit of the vocoder voice frame, i.e., the bit sequences $S_0$ and $S_1$ associated with the selected BER' indicate the location of a vocoder voice frame within a data burst. Embodiments of the present invention are not limited in this regard.

Figure 9:
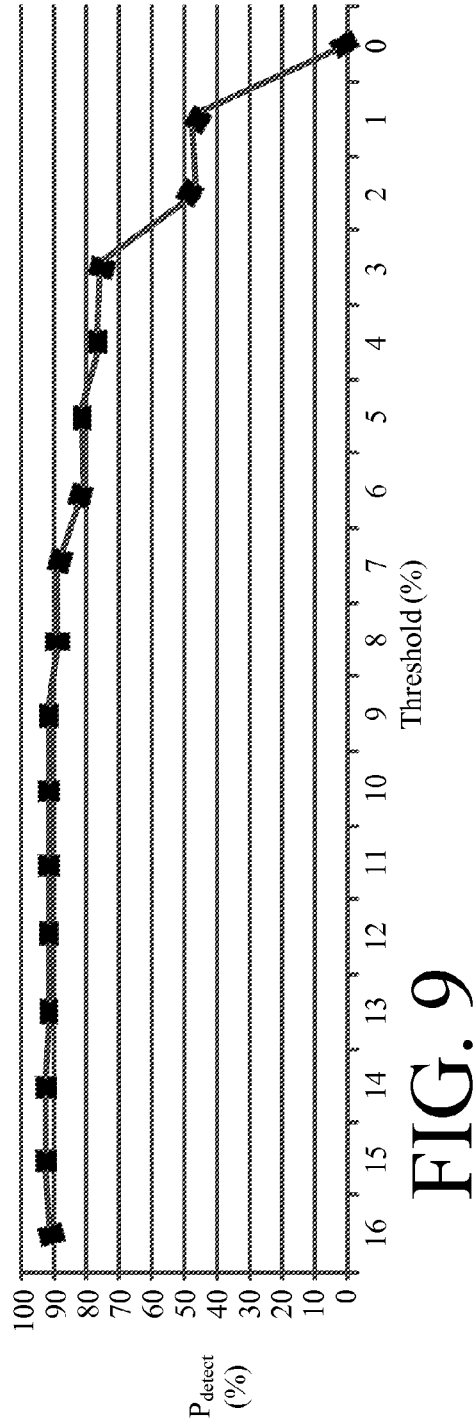
Figure 10:
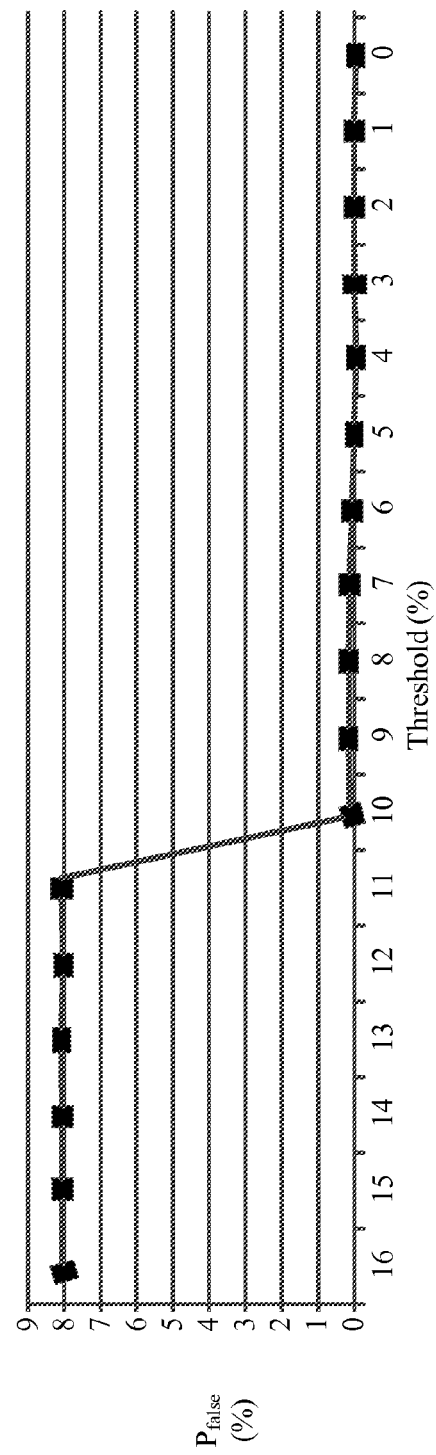

Referring now to FIGS. 9-10, graphs 900, 1000 are provided for a single vocoder voice frame of a data burst contained in a strong signal. The graphs 900, 1000 are useful for understanding how a threshold value can be selected for utilization in the above described frame synchronization process. The graph 900 generally illustrates what the probability of detection ("$P_{detect}$") would be if certain thresholds were employed to identify the BER' with the minimum value $P_{detect}$ is plotted along the vertical axis of graph 900 and threshold values are plotted along the horizontal axis of graph 900. The graph 1000 generally illustrates what the probability of a false detection ("$P_{false}$") would be if certain thresholds were employed to identify the BER' with the minimum value. $P_{false}$ is plotted along the vertical axis of graph 1000 and threshold values are plotted along the horizontal axis of graph 1000. As evident from graph 900, $P_{detect}$ is maximized (i.e., it has its highest value) when the threshold has a value between sixteen percent (16%) and eight percent (8%). As evident from graph 1000, $P_{false}$ is minimized (i.e., it has its lowest value) when the threshold has a value between zero (0) and ten (10). Accordingly, a threshold having a value between nine (9) and ten (10) is selected because $P_{detect}$ is maximized and $P_{false}$ is minimized for those threshold values.

Referring now to FIG. 21, there is provided a conceptual diagram of a novel frame synchronization process that is useful for understanding the present invention. Notably, the frame synchronization process of FIG. 21 is for simultaneously determining the locations of two (2) vocoder voice frame. The invention is not limited to scenarios where the locations of only two (2) vocoder voice frames are simultaneously determined. The present invention concerns simultaneously determining locations for any number of vocoder voice frames selected in accordance with a particular application (e.g., four vocoder voice frames).

As shown in FIG. 21, the frame synchronization process begins with processing steps 2102 and 2104. In processing step 2102, a combined BER estimate ("$BER'_1$") is determined for a first vocoder voice frame. In processing step 2104, a combined BER estimate ("$BER'_2$") is determined for a second vocoder voice frame. $BER'_1$ and $BER'_2$ are determined in substantially the same manner as BER' of FIG. 5. As such, processing steps 2102 and 2104 each comprise the performance of processing steps 504-512 of FIG. 5. However, the bit sequences $S_0$ and $S_1$ used for the two (2) vocoder voice frames in processing steps 2102 and 2104 are different from each other. For example, the bits sequence $S_0$ used for the first vocoder voice frame is different then the bit sequence $S_0$ used for the second vocoder voice frame. Similarly, the bit sequence $S_1$ for the first vocoder voice frame is different then the bit sequence $S_1$ used for the second vocoder voice frame.

After $BER'_1$ and $BER'_2$ have been determined, processing step 1206 is performed where they are combined to obtain a combined BER estimate ("BER''"). BER'' includes, but is not limited to, a sum of the $BER'_1$, $BER'_2$ or an average of the $BER'_1$, $BER'_2$. BER'' is then stored in a data store. Thereafter, a next iteration of processing steps 2102, 2104 and 2106 is performed to obtain a BER'' for a next set of bit sequences. Any number of iterations of processing steps 2102, 2104 and 2106 can be performed in accordance with a particular application. Subsequent to completing the predefined number of iterations of processing steps 2102, 2104 and 2106, processing step 2108 is performed.

In processing step 2108, a minimum BER'' is identified. This identification is achieved by: selecting a BER'' from a plurality of BERs'' that has the lowest value; and/or selecting a BER'' from a plurality of BERs'' that has a value less than a threshold. The threshold can be employed to improve the probability of a detection and reduce the probability of a false detection of start locations of the two (2) vocoder voice frames within a data burst of a weak signal. In the threshold scenario, the data burst is discarded if a BER'' does not have a value below the threshold. The manner in which a threshold is selected will be described below in relation to FIGS. 11-14. Still, it should be understood that the threshold is selected to maximize the probability of detection of the correct start locations of the vocoder voice frames, and minimize the probability of a false detection of the correct start locations of the vocoder voice frames. The two sets of bit sequences $S_0$ and $S_1$ which are associated with the selected BER'' specify which bits in a data burst are the start bits of the vocoder voice frames and the end bits of the vocoder voice frames.

Referring now to FIGS. 11-12, graphs 1100, 1200 are provided for two (2) vocoder voice frames of a data burst contained in a strong signal. The graphs 1100, 1200 are useful for understanding how a threshold value can be selected for utilization in the above described frame synchronization process of FIG. 21. The graph 1100 generally illustrates what $P_{detect}$ would be if certain thresholds were employed to identify the BER' with the minimum value. $P_{detect}$ is plotted along the vertical axis of graph 1100 and threshold values are plotted along the horizontal axis of graph 1100. The graph 1200 generally illustrates what $P_{false}$ would be if certain thresholds were employed to identify the BER' with the minimum value. $P_{false}$ is plotted along the vertical axis of graph 1200 and threshold values are plotted along the horizontal axis of graph 1200. As evident from graph 1100, $P_{detect}$ is maximized (i.e., it has its highest value) when the threshold has a value between sixteen percent (16%) and nine percent (9%). As evident from graph 1200, $P_{false}$ is minimized (i.e., it has its lowest value) when the threshold has a value between zero (0) and sixteen (16). Accordingly, a threshold having a value between nine (9) and ten (10) is selected because $P_{detect}$ is maximized and $P_{false}$ is minimized for those threshold values.

Figure 13:
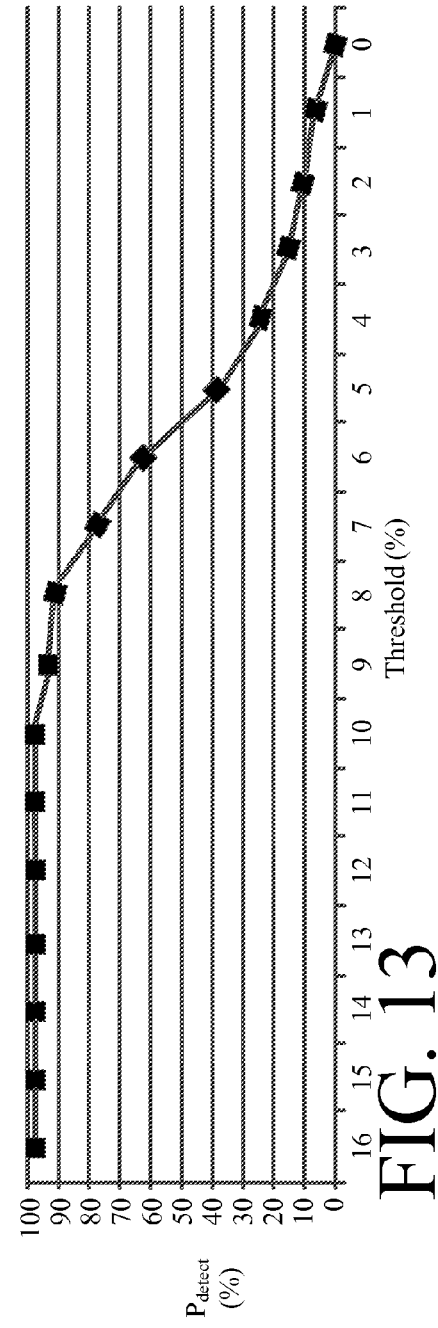
Figure 14:
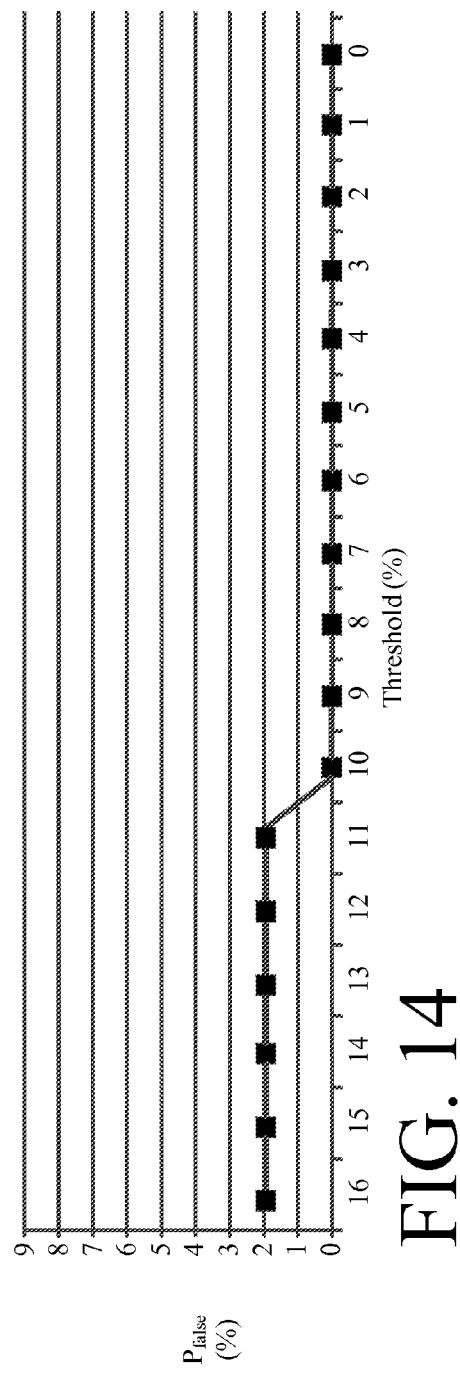

Referring now to FIGS. 13-14, graphs 1300, 1400 are provided for two (2) vocoder voice frames of a data burst contained in a weak signal. The graphs 1300, 1400 are useful for understanding how a threshold value can be selected for utilization in the above described frame synchronization process of FIG. 21. The graph 1300 generally illustrates what $P_{detect}$ would be if certain thresholds were employed to identify the BER' with the minimum value. $P_{detect}$ is potted along the vertical axis of graph 1300 and threshold values are plotted along the horizontal axis of graph 1300. The graph 1400 generally illustrates what $P_{false}$ would be if certain thresholds were employed to identify the BER' with the minimum value. $P_{false}$ is plotted along the vertical axis of graph 1400 and threshold values are plotted along the horizontal axis of graph

1400. As evident from graph 1300, $P_{detect}$ is maximized (i.e., it has its highest value or near its highest value) when the threshold has a value between sixteen percent (16%) and ten percent (10%). As evident from graph 1400, $P_{false}$ is minimized (i.e., it has its lowest value) when the threshold has a value between zero (0) and ten (10). Accordingly, a threshold having a value of ten (10) is selected because $P_{detect}$ is maximized and $P_{false}$ is minimized for those threshold values.

In some embodiments of the present invention, the optimized threshold values selected using each of the graphs 1100, 1200, 1300, 1400 can be analyzed to select the actual threshold value used in a frame synchronization process for two vocoder voice frames. For example, an analysis of graphs 1100 and 1200 resulted in the selection of a threshold having a value between nine (9) and ten (10). An analysis of graphs 1300 and 1400 resulted in the selection of a threshold having a value of ten (10). Since all of the results include a common threshold value of ten (10), this value is selected as the actual threshold value used a frame synchronization process. Embodiments of the present invention are not limited in this regard.

Exemplary Methods Embodiments of the Present Invention

Figure 15:
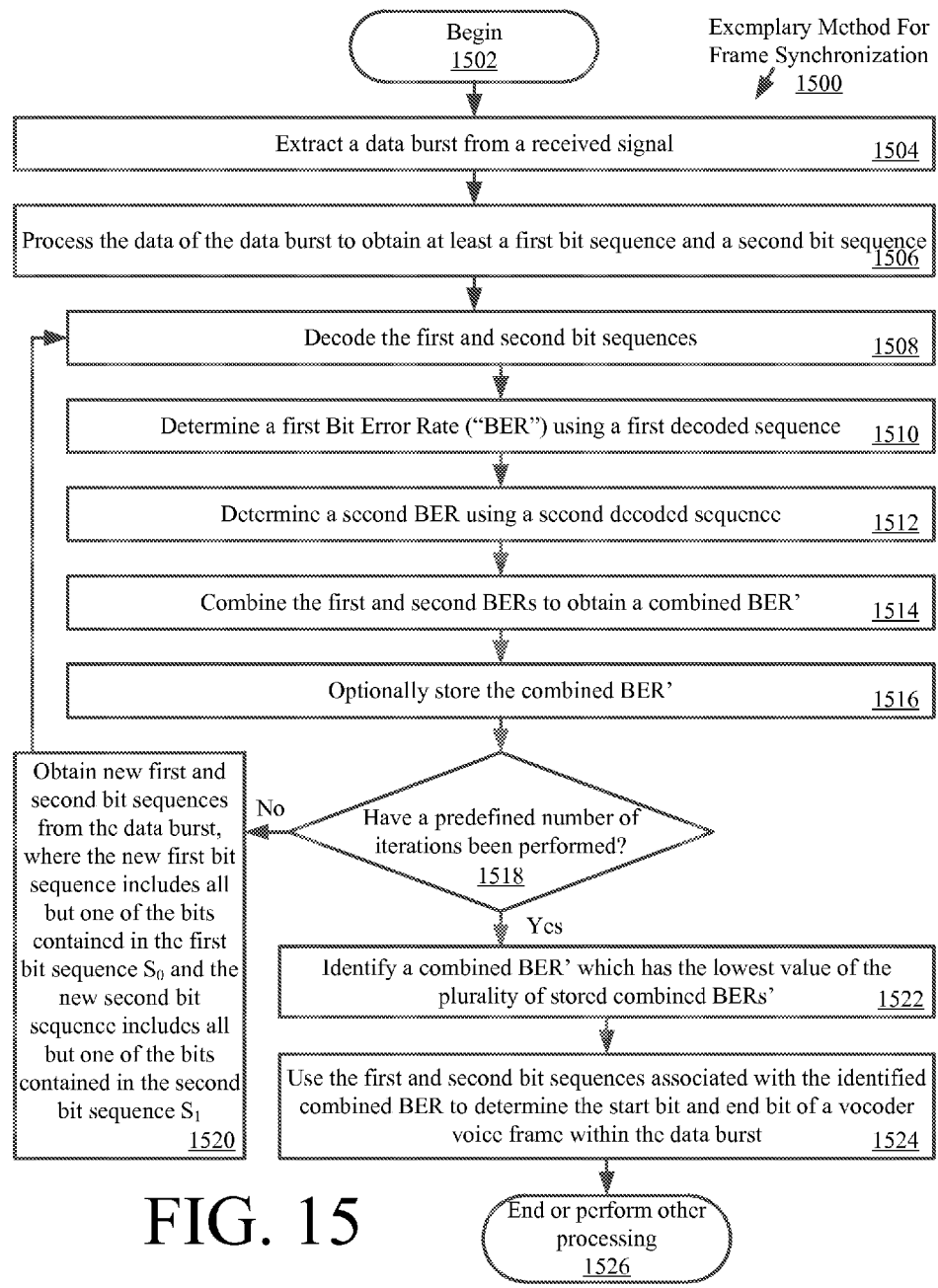
FIG. 15 and FIG. 22 each provide a flow diagram of an exemplary method for frame synchronization that is useful for understanding the present invention.

Referring now to FIG. 15, there is provided a flow diagram of an exemplary method 500 for frame synchronization between a transmitting device and a receiving device that is useful for understanding the present invention. Notably, the method 1500 is useful for establishing frame synchronization for a single vocoder voice frame. As such, the method 1500 implements the concepts described above in relation to FIGS. 5-10. The steps 1502-1524 of method 1500 are performed by a receiving device (e.g., fixed network equipment) for determining the start location and/or end location of a vocoder voice frame within a data burst of a received signal.

As shown in FIG. 15, the method 1500 begins with step 1502 and continues with step 1504. In step 1504, a bit stream of a data burst is extracted from a received signal. The bit stream is then processed in step 1506 to obtain a first bit sequence (e.g., bit sequence $S_0$ of FIG. 5) and a second bit sequence (e.g., bit sequence $S_1$ of FIG. 5). The first and second bit sequences include different bits contained in the bit stream of the data burst. The first and second bit sequences also include any number of bits selected in accordance with a particular application. For example, the first bit sequence includes twenty four (24) bits and the second bit sequence includes twenty three (23) bits. Embodiments of the present invention are not limited in this regard.

In a next step 1508, the first and second bit sequences are decoded. The decoding is achieved using a decoding process selected in accordance with a particular application. For example, the decoding is achieved using an extended Golay decoder for the first bit sequence and a modulated Golay decoder for the second bit sequence. Golay decoders are well known in the art, and therefore will not be described herein. Embodiments of the present invention are not limited in this regard. Any known decoding scheme can be used with the present invention without limitation.

After completing step 1508, step 1510 is performed where the first decoded bit sequence (e.g., bit sequence $S'_0$ of FIG. 5) is used to determine a first BER (e.g., BER 516 of FIG. 5). In embodiments of the present invention, the first BER is determined by comparing the first bit sequence with the first decoded bit sequence to identify the bit values of the first bit sequence which were changed by the decoding process of step 1508. The number of bit values changed by the decoding process are then counted. This number is then divided by the total number of bits contained in the first bit sequence. The result of the division operation represents the first BER. Embodiments of the present invention are not limited in this regard. For example, the number of bit values changed by the decoding process may present the first BER, rather than the result of the division operation.

In step 1512, the second decoded bit sequence (e.g., bit sequence $S'_1$ of FIG. 5) is used to determine a second BER (e.g., BER 518 of FIG. 5). The second BER is determined in substantially the same manner as the first BER.

Subsequent to determining the first and second BERs, step 1514 is performed. In step 1514, the first and second BERs are combined to obtain a BER'. The combining involves: adding the first and second BERs together; and/or averaging the first and second BERs. Thereafter, BER' is stored in a data store for later use in subsequent step 1522, as shown by step 1516.

Upon completing step 1516, a decision step 1518 is performed to determine whether or not a predefined number of iterations of steps 1508-1516 have been performed. If the predefined number of iterations have not been performed [1518:NO], then the method 1500 continues with step 1520. Step 1520 involves obtaining a new first bit sequence and a new second bit sequence. The new first bit sequence includes all but one (1) of the bits contained in the first bit sequence. The new second bit sequence includes all bit one (1) of the bits contained in the second bit sequence. The new first and second bit sequences are then used in a second iteration of steps 1508-1516.

If the predefined number of iterations have been performed [1518:YES], then the method 1500 continues with step 1522. Step 1522 involves identifying a BER' that has the lowest value of the plurality of combined BER estimates which were previously stored in step 1516. The BER' selection can be achieved by: selecting the BER' with the lowest value; and/or selecting a BER' with a value less than a threshold value. If none of the combined BER estimates have a value below the threshold value, then the data burst is discarded and method 1500 is repeated for a next received data burst.

In a next step 1524, the first and second bit sequences associated with the identified BER' are used to identify the start bit and end bit of a vocoder voice frame within the data burst. For example, the first bit of the associated first bit sequence is selected as the first bit of the vocoder voice frame. Similarly, the last bit of the associated second bit sequence is selected as the last bit of the vocoder voice frame. Embodiments of the present invention are not limited in this regard.

Subsequent to completing step 1524, step 1526 is performed where the method 1500 ends or other processing is performed. The other processing can include, but is not limited to, repeating method 1500 to identify the start and end locations of another vocoder voice frame within the data burst and/or repeating method 1500 to identify the start and end location of vocoder voice frame within another data burst.

Figure 22:
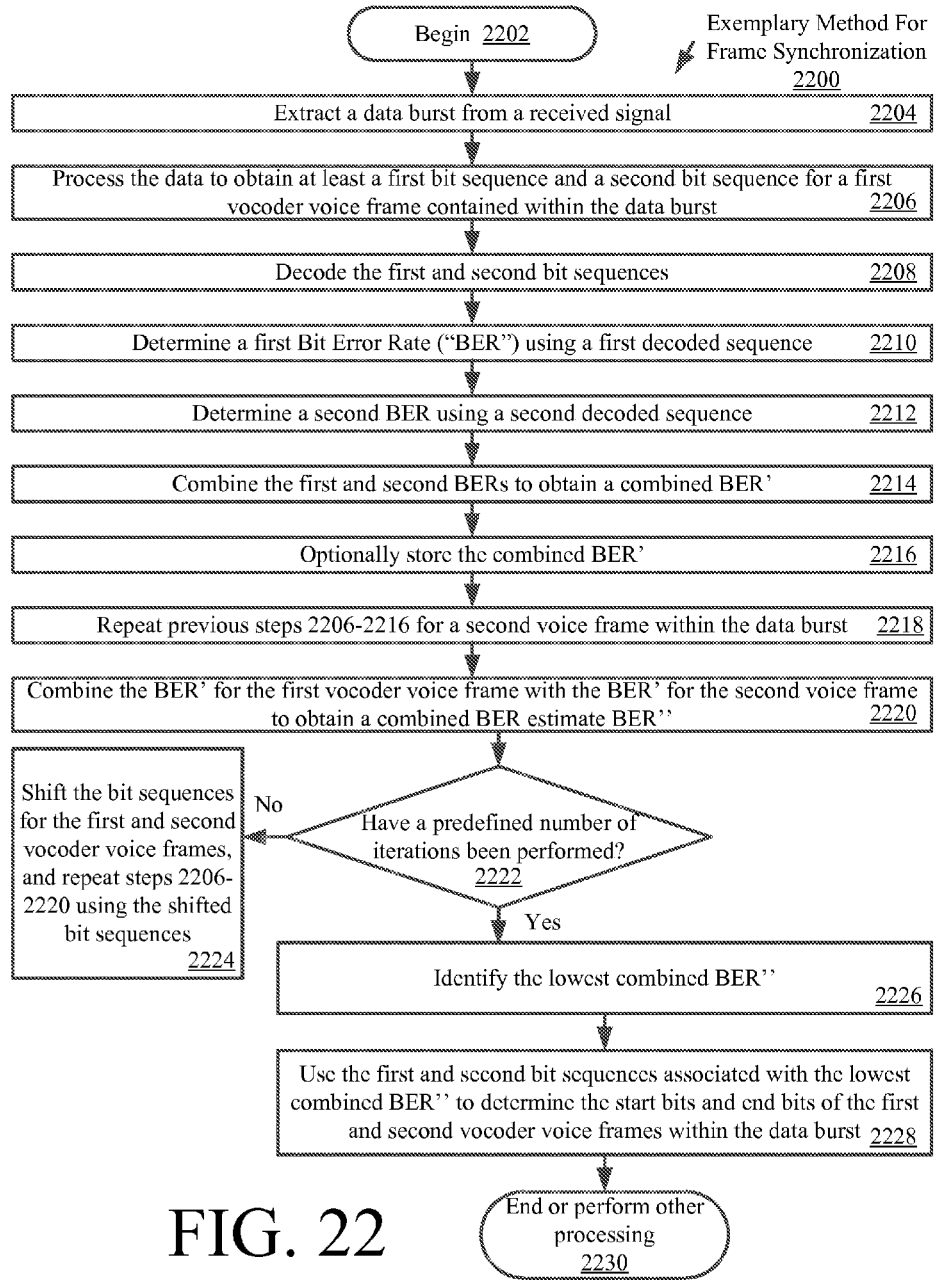

Referring now to FIG. 22, there is provided a flow diagram of another exemplary method 2200 for frame synchronization between a transmitting device and a receiving device that is useful for understanding the present invention. Notably, the method 2200 is useful for establishing frame synchronization for two vocoder voice frames. As such, the method 2200 implements the concepts described above in relation to FIGS. 21 and 11-14. The steps of method 2200 are performed by a receiving device (e.g., fixed network equipment) for simultaneously determining the start locations and/or end locations of two (2) vocoder voice frames within a data burst of a received signal.

As shown in FIG. 22, the method 2200 begins with step 2202 and continues with step 2204. In step 2204, a bit stream of a data burst is extracted from a received signal. The bit stream is then processed in step 2206 to obtain at a first bit sequence (e.g., bit sequence $S_0$ of FIG. 5) and a second bit sequence (e.g., bit sequence $S_1$ of FIG. 5) for a first vocoder voice frame contained within the data burst. The first and second bit sequences include different bits contained in the bit stream of the data burst. The first and second bit sequences also include any number of bits selected in accordance with a particular application. For example, the first bit sequence includes twenty four (24) bits and the second bit sequence includes twenty three (23) bits. Embodiments of the present invention are not limited in this regard.

In a next step 2208, the first and second bit sequences are decoded. The decoding is achieved using a decoding process selected in accordance with a particular application. For example, the decoding is achieved using an extended Golay decoder for the first bit sequence and a modulated Golay decoder for the second bit sequence. Golay decoders are well known in the art, and therefore will not be described herein. Embodiments of the present invention are not limited in this regard. Any known decoding scheme can be used with the present invention without limitation.

After completing step 2208, step 2210 is performed where the first decoded bit sequence (e.g., bit sequence $S'_0$ of FIG. 5) is used to determine a first BER (e.g., BER 516 of FIG. 5) for the first vocoder voice frame. In embodiments of the present invention, the first BER is determined by comparing the first bit sequence with the first decoded bit sequence to identify the bit values of the first bit sequence which were changed by the decoding process of step 2208. The number of bit values changed by the decoding process are then counted. This number is then divided by the total number of bits contained in the first bit sequence. The result of the division operation represents the first BER. Embodiments of the present invention are not limited in this regard. For example, the number of bit values changed by the decoding process may present the first BER, rather than the result of the division operation.

In step 2212, the second decoded bit sequence (e.g., bit sequence $S'_1$ of FIG. 5) is used to determine a second BER (e.g., BER 518 of FIG. 5) for the first vocoder voice frame. The second BER is determined in substantially the same manner as the first BER.

Subsequent to determining the first and second BERs, step 2214 is performed. In step 2214, the first and second BERs are combined to obtain a BER'. The combining involves: adding the first and second BERs together; and/or averaging the first and second BERs. Thereafter, BER' is stored in a data store for later use in subsequent step 2226, as shown by optionally step 2216.

Upon completing step 2216, step 2218 is performed where steps 2206-2216 are repeated from a second vocoder voice frame contained within the data burst. In a next step 2220, the BER' for the first vocoder voice frame is combined with the BER' for the second vocoder voice frame to obtain a combined BER estimate ("BER'").

Thereafter, a decision step 2222 is performed to determine whether or not a predefined number of iterations of steps 2208-2220 have been performed. If the predefined number of iterations have not been performed [2222:NO], then the method 2200 continues with step 2224. Step 2224 involves shifting the bit sequences for the first and second vocoder voice frames. Step 2224 also involves repeating steps 2206-2220 using the shifted sequences to obtain.

If the predefined number of iterations have been performed [2218:YES], then the method 2200 continues with step 2226. Step 2226 involves identifying the lowest BER" from the plurality of combined BER estimates which were previously determined in step 2220. The BER" selection can be achieved by: selecting the BER" with the lowest value; and/or selecting a BER" with a value less than a threshold value. If none of the combined BER estimates determined in step 2220 have a value below the threshold value, then the data burst is discarded and method 2200 is repeated for a next received data burst.

In a next step 2228, the two sets of first and second bit sequences associated with the lowest BER" are used to identify the start bits and end bits of the vocoder voice frames within the data burst. Subsequent to completing step 2228, step 2230 is performed where the method 2200 ends or other processing is performed.

Exemplary Communication Systems Implementing the Present Invention

Notably, the above described method facilitates the provision of an improved late call entry process in implementing communication systems of the present invention. For example, the implementing systems of the present invention have a late call entry time which is reduced as compared to that of conventional communication systems. Also in the implementing systems of the present invention, less audio information is lost during the performance of a late call entry process as compared to the amount of information that is lost during the performance of a conventional late call entry process (e.g., the SACCH based late call entry process of P25 Page II communication systems described above in the background section of this document). Exemplary implementing communications will now be described below in relation to FIGS. 16-19.

Figure 16:
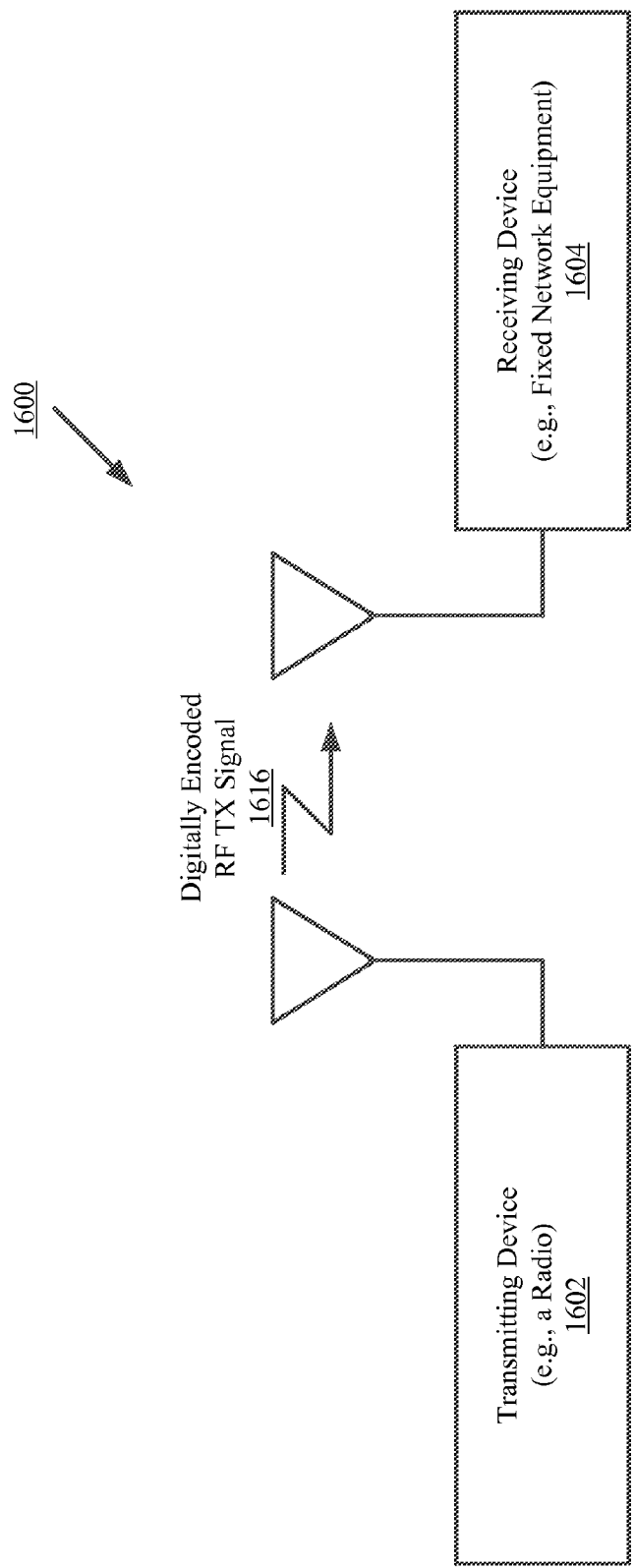
FIG. 16 is a block diagram of an exemplary communication system that is useful for understanding the present invention.

Referring now to FIG. 16, there is provided a block diagram of an exemplary Communication System ("CS") 1600 that is useful for understanding the present invention. Notably, the CS 1600 implements the concepts described above in relation to FIGS. 1-14 and/or the method 1500 described above in relation to FIG. 15. Also, the CS 1600 has an improved late call entry time as compared to that of conventional communication systems. For example, in a P25 Phase 2 TDMA based communication system, a late entry time can be reduced from: one hundred eighty (180) milliseconds to less than seventy five (75) milliseconds; three hundred sixty (360) milliseconds to less than ninety (90) millisecond or seventy five (75) milliseconds; and/or seven hundred twenty (720) milliseconds to less than ninety (90) milliseconds. The improved late entry time is at least partially due to the ability of the CS 1600 to establish frame synchronization between a transmitting device 1602 and a receiving device 1604 based on information contained in data bursts, rather than information contained in inbound talker SACCH data as described above in the background section of this document. The information includes, but is not limited to, pilot symbols, voice frames, DUIDs, ESS information and RSSIs.

Figure 17:
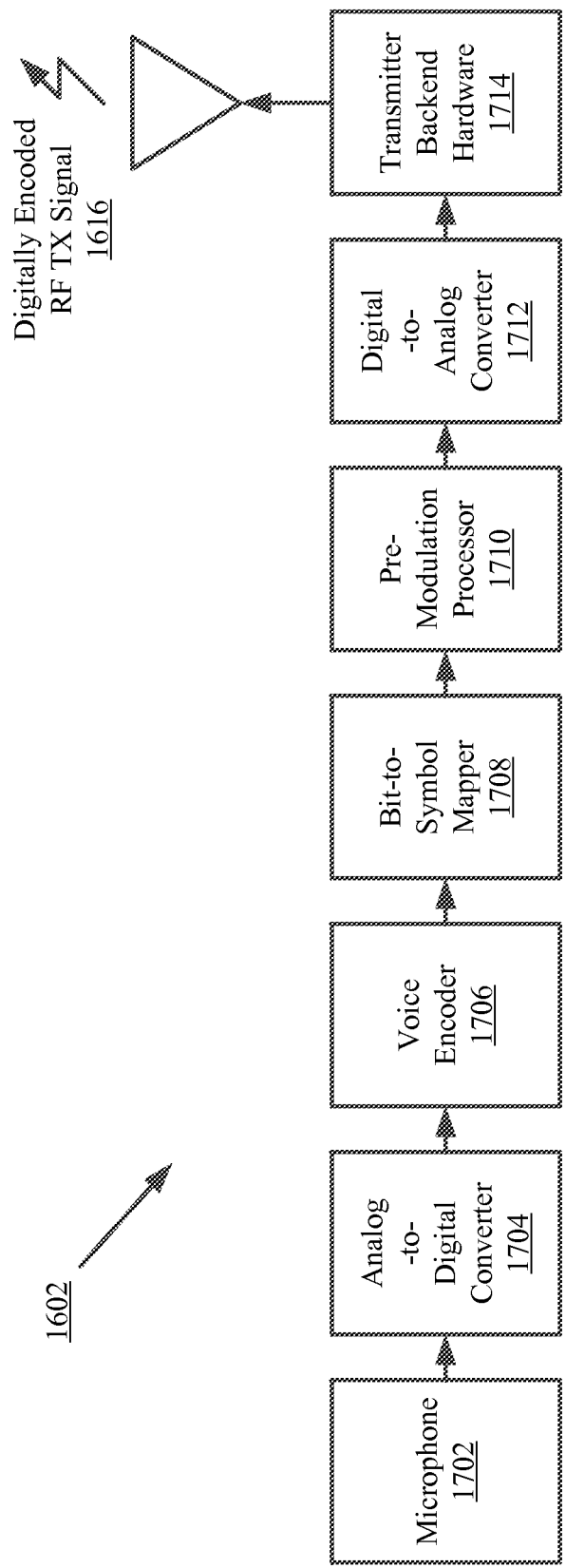
FIG. 17 is a block diagram of the transmitting device shown in FIG. 16 that is useful for understanding the present invention.

A detailed block diagram of the transmitting device 1602 is provided in FIG. 17. As shown in FIG. 17, the transmitting device 1602 includes a microphone 1702, an Analog-to-Digital ("A/D") converter 1704, a voice encoder 1706, a Bit-to-Symbol ("B/S") mapper 1708, a pre-modulation processor 1710, a Digital-to-Analog ("D/A") converter 1712 and transmitter backend hardware 1714. The components of the transmitting device 1602 can include hardware, software and/or a combination thereof. The hardware includes, but is not limited to, at least one electronic circuit configured to performed certain device specific operations.

The microphone 1702 is configured to generate an analog signal and communicate the same to A/D converter 1704. At the A/D converter 1704, the analog signal is converted to a digital signal. Additional analog processing may optionally be applied prior to this conversion, but is not required to practice various embodiments of the present invention and thus is not shown in FIG. 17. The digital signal is then sent from the A/D converter 1704 to the voice encoder 1706. The voice encoder 1706 processes the digital signal to reduce the transmitted bandwidth by efficiently encoding the audio speech into a sequence of ones and zeros, commonly called bits. The bit sequence is then passed to the B/S mapper 1708. The B/S mapper 1708 transforms the bit sequence into a sequence of signals that correspond to allowable symbols in the digital modulation scheme chosen. For example, if C4FM modulation is employed, then the bit sequence is mapped into a sequence comprising four symbols (+3, +1, −1, +3). Each symbol represents two (2) bits of information. Embodiments of the present invention are not limited in this regard.

The sequence of signals is then processed in the pre-modulation processor 1710 to produce a smoothed digital signal. The digital signal is then converted into an analog signal by A/D converter 1712. The analog signal is then sent to the transmitter backend hardware 1714 for further processing. The transmitter backend hardware 1714 can include, but is not limited to, amplifiers, filters and Radio Frequency ("RF") up converters.

Figure 18:
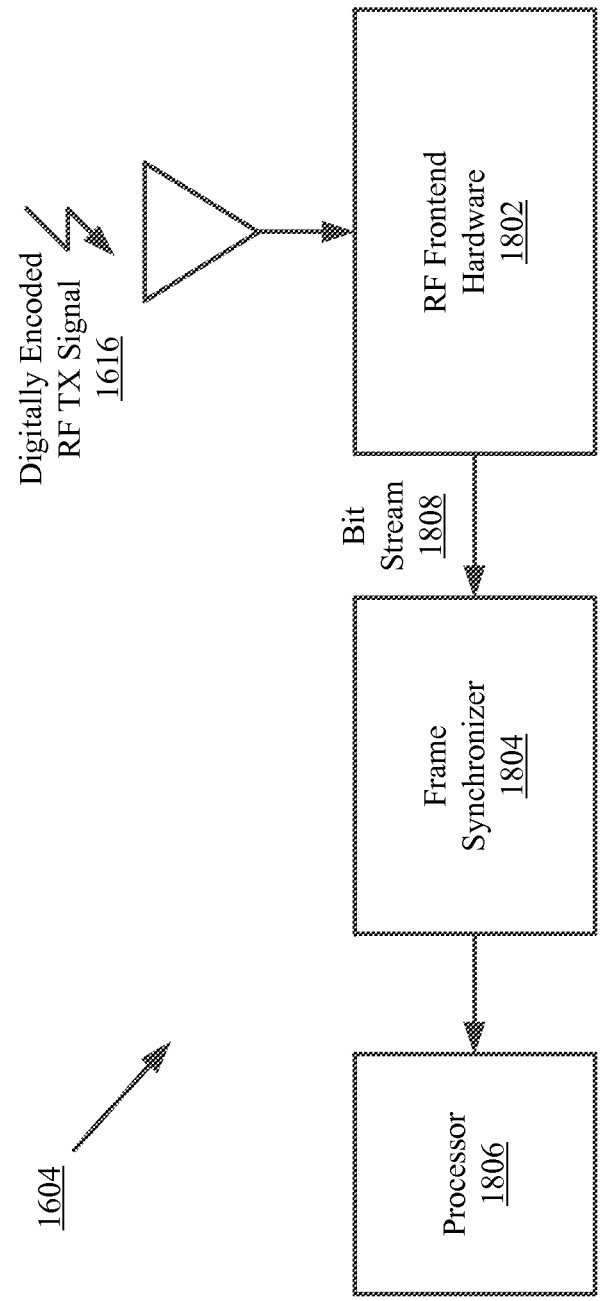
FIG. 18 is a block diagram of the receiving device shown in FIG. 16 that is useful for understanding the present invention.

Referring now to FIG. 18, there is provided a detailed block diagram of the receiving device 1604 of FIG. 16. The receiving device 1604 comprises RF frontend hardware 1802, a frame synchronizer 1804 and a processor 1806. The components of the receiving device 1604 can include hardware, software and/or a combination thereof. The hardware includes, but is not limited to, at least one electronic circuit configured to performed certain device specific operations.

The RF frontend hardware 1802 includes, but is not limited to, amplifiers, filters, A/D converters, demodulators and/or symbol synchronizers. The output of the RF frontend hardware 1802 is a bit stream 1808 of a data burst. The bit stream 1808 is passed to the frame synchronizer 1804 where it is used to establish frame synchronization between the receiving device 1604 and the transmitting device 1602. In this regard, the frame synchronizer 1804 implements the above described method 1500. The frame synchronizer will be described in detail below in relation to FIG. 19. The output of the frame synchronizer is passed to the processor 1806. The processor 1806 includes, but is not limited to, symbol detectors, frame detectors, de-interleavers, decoders, error detectors, error correctors, and/or other such processing devices.

Figure 19:
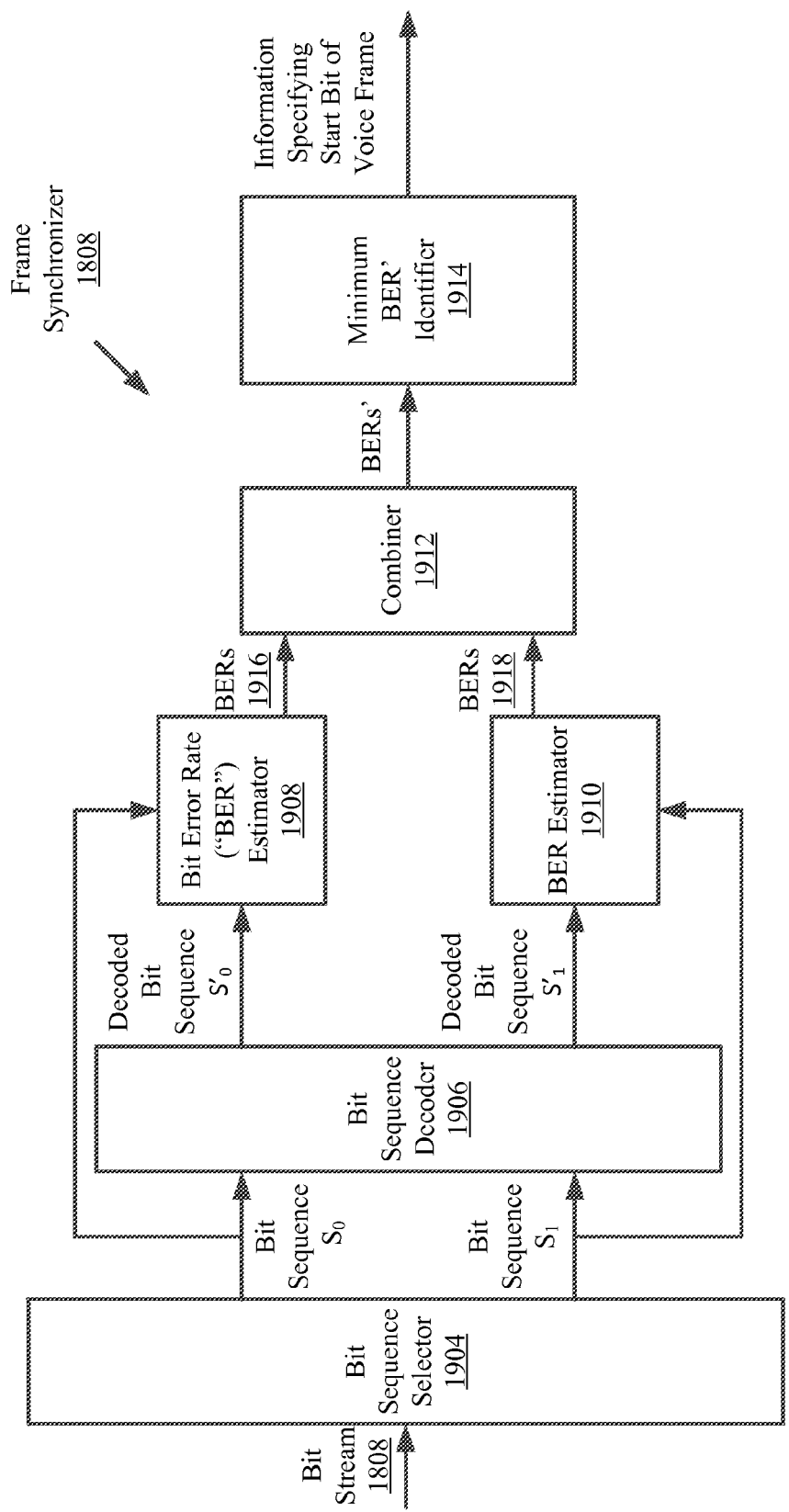
FIG. 19 is a block diagram of the frame synchronizer shown in FIG. 18 that is useful for understanding the present invention.

Referring now to FIG. 19, there is provided a detailed block diagram of the frame synchronizer 1804 of FIG. 18. As noted above, the frame synchronizer 1804 implements the above described method 1500. As such, the frame synchronizer 1804 comprises a bit sequence selector 1904, a bit sequence decoder 1906, BER estimators 1908, 1910, a combiner 1912 and a minimum BER's identifier 1914.

During operation, the bit sequence selector 1904 receives a bit stream 1808 from the RF front end hardware 1802 (described above in relation to FIG. 18). Thereafter, the bit sequence selector 1904 selects and extracts two (2) different bit sequences $S_0$ and $S_1$ from the bit stream 1808. The bit sequences $S_0$ and $S_1$ can include any bits from the bit stream 1808 and any number of bits selected in accordance with a particular application. For example, the bit sequence $S_0$ includes the first ($1^{st}$) twenty four (24) bits of the bit stream 1808. In contrast, the bit sequence $S_1$ includes twenty three (23) bits of the bits stream 1808. The twenty three (23) bits include bits twenty ninth (29) through fifty one (51) of the bit stream 1808. Embodiments of the present invention are not limited in this regard.

The bits sequences $S_0$ and $S_1$ are then passed to the bit sequence decoder 1906. At the bit sequence decoder 1906, the bit sequences $S_0$ and $S_1$ are decoded to generate decoded bit sequences $S'_0$ and $S'_1$. Methods for decoding bit sequences are well known in the art, and therefore will not be described herein. Any such method for decoding bits sequences can be used with the present invention without limitation.

Figure 20:
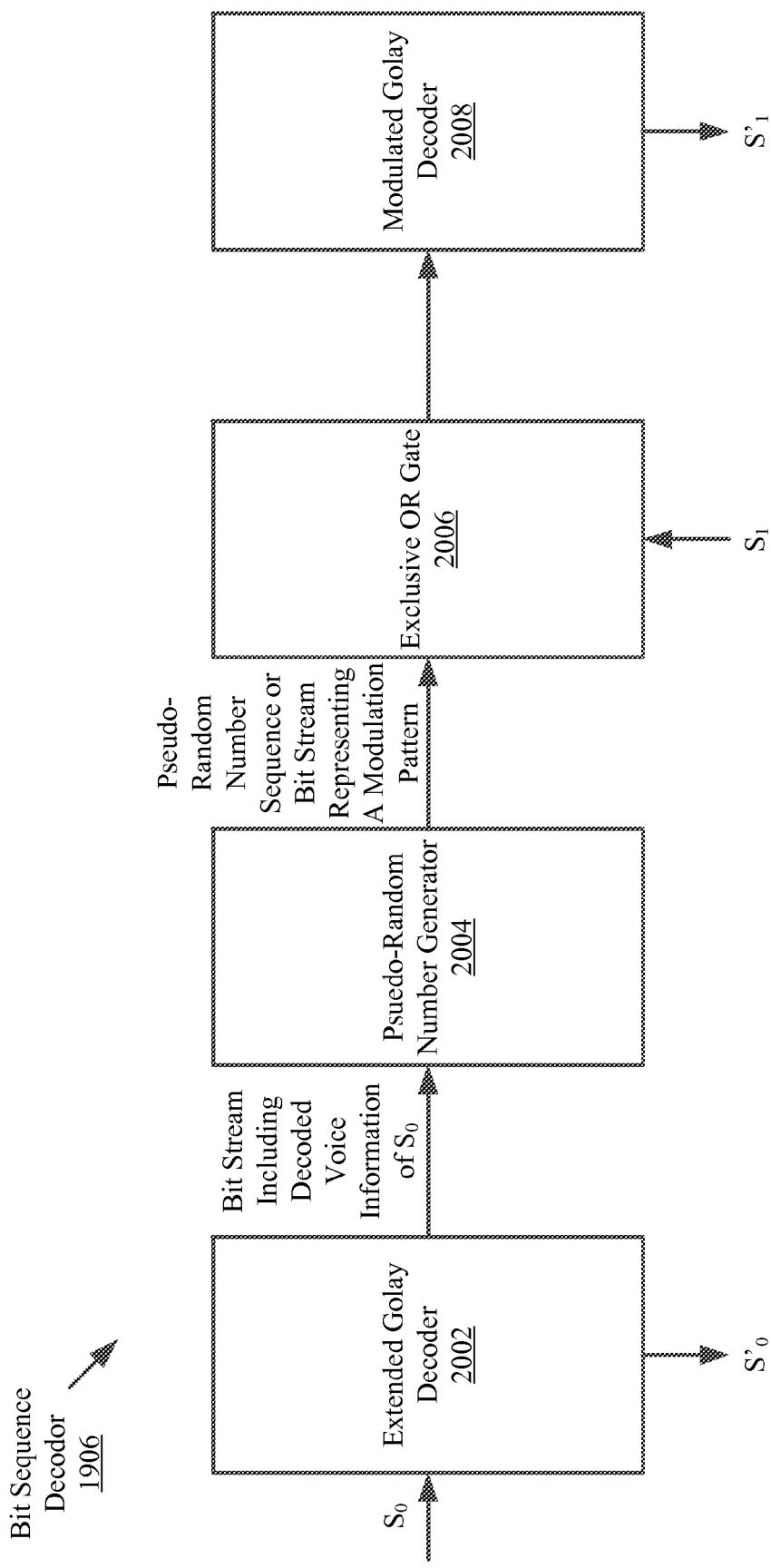
FIG. 20 is a block diagram of an exemplary bit sequence decoder that is useful for understanding the present invention.

According to embodiments of the present invention, the bit sequence decoder 1906 includes a enhanced half rate vocoder available from Digital Voice Systems, Inc. of Westford, Mass. The enhanced half rate vocoder is generally implemented as a software application executed by a processing device. The software application is known as DVSI Vocoder Software Version 2.1.2.0.02. A schematic illustration of this decoder is provided in FIG. 20. As shown in FIG. 20, the decoder includes a (24,12) extended Golay decoder 2002, a pseudo-random number generator 2004, an exclusive OR gate 2006 and a (23, 12) Modulated Golay decoder 2008. Golay decoders, pseudo-random number generators and exclusive OR gates are well known in the art, and therefore will not be described herein. Still, it should be understood that, in this scenario, the bit sequence $S_0$ comprises twenty four (24) bits from the data stream 1808 and is decoded by the (24,12) extended Golay decoder. The output of the (24,12) extended Golay decoder is a bit sequence $S'_0$ comprising twenty four (24) decoded bits. The bit sequence $S_1$ comprises twenty three (23) bits from the data stream 1808 and is decoded by the (23, 12) Modulated Golay decoder. The bits of sequence $S_1$ are different than the bits of sequence $S_0$. The output of the (23, 12) Modulated Golay decoder is a bit sequence $S'_1$ comprising twenty three (23) decoded bits. Embodiments of the present invention are not limited in this regard.

Referring again to FIG. 19, the decoded bit sequence $S'_0$ is sent to the BER estimator 1908 and the decoded bit sequence $S'_1$ is sent to the BER estimator 1910. The BER estimators 1908, 1910 process the decoded bit sequences $S'_0$, $S'_1$ to determine BER estimates 1916, 1918. The BER estimates 1916, 1918 are then combined by combiner 1912 to obtain a first BER'. The first BER' includes, but is not limited to, a sum of the BER estimates 1916, 1618 or an average of the BER estimates 1916, 1918. As such, the combiner 1912 can include, but is not limited to, an adder circuit and/or a divider circuit. The first BER' is then passed to the minimum BER' identifier 1914. The minimum BER' identifier 1914 can include a data store (not shown) for temporarily storing the first BER'. Subsequently, the minimum BER' identifier 1914 waits for a second BER'.

The second BER' is computed for new bit sequences $S_{0-new}$, $S_{1-new}$ by performing the above described operations of components 1904-1912 again. A first one of the new bit sequences $S_{0-new}$ comprises all but one (1) of the bits contained in original bit sequence $S_0$. Similarly, a second one of the new bit sequences $S_{1-new}$ comprises all but one (1) of the bits contained in original bit sequence $S_1$. For example, if the bit sequence $S_0$ is defined as {$bit_0$, $bit_1$, $bit_2$, $bit_3$, $bit_4$, $bit_5$, . . . , $bit_{23}$}, then the new bit sequence $S_{0-new}$ is defined as {$bit_1$, $bit_2$, $bit_3$, $bit_4$, $bit_5$, . . . , $bit_{24}$}. Likewise, if the bit sequence $S_1$ is defined as {$bit_{29}$, $bit_{30}$, $bit_{31}$, $bit_{32}$, $bit_{33}$, $bit_{34}$, . . . , $bit_{51}$}, then the new bit sequence $S_{1-new}$ is defined as {$bit_{30}$, $bit_{31}$, $bit_{32}$, $bit_{33}$, $bit_{34}$, . . . , $bit_{51}$, $bit_{52}$}. Embodiments of the present invention are not limited in this regard.

Any number of iterations of the above-described operations performed by components 1904-1914 can be performed in accordance with a particular application. For example, twenty one (21) iterations of the above-described operations are performed to determine the start location of a single vocoder voice frame of a data burst. If the data burst includes two (2) or more vocoder voice frames, then the twenty one (21) iterations need to be performed for each vocoder voice frame. In this scenario, the start of a single vocoder voice frame is found at least partially by shifting the bits of a received data burst through the bit sequence decoder 1906. The output of the bit sequence decoder 1906 includes twenty one (21) decoded sequences S'$_0$ and twenty one (21) decoded sequences S'$_1$. The forty two (42) decoded sequences are used to obtain twenty one (21) BERs 1916 and twenty one (21) BERs 1918. Embodiments of the present invention are not limited in this regard.

Referring again to FIG. 19, the minimum BER' identifier 1914 performs operations to identify the BER' of the plurality of stored combined BER estimates which has the lowest value. This identification is achieved by: selecting a BER' from the plurality of stored combined BER estimates that has the lowest value; and/or selecting a BER' from the plurality of stored combined BER estimates that has a value less than a threshold. The threshold can be employed to improve the probability of a detection and reduce the probability of a false detection of a start location of a vocoder voice frame within a data burst of a weak signal. In the threshold scenario, the bit stream 1808 of the data burst is discarded if a BER' does not have a value below the threshold.

The manner in which a threshold is selected is described above in relation to FIGS. 9-14. Still, it should be understood that the threshold is selected to maximize the probability of detection of the correct start location of a vocoder voice frame, and minimize the probability of a false detection of the correct start location of the vocoder voice frame. The selected BER' indicates which bit in a data burst is the first bit of a vocoder voice frame, i.e., the selected BER' specifies the start location of a vocoder voice frame within a data burst.

Notably, the frame synchronizer 1808 facilitates the improvement of audio quality and the minimization of audio losses associated with missed voice packets. In this regard, it should be understood that faster late entry times help reduce audio losses associated with missed known synchronization patterns and/or inbound talker SACCH data. As such, the CS 1600 of the present invention has certain advantages over communication systems employing conventional frame synchronization techniques. More particularly, the CS 1600 has an improved delay associated with late call entry and an improved audio quality resulting from dropped packets as compared to the communication systems employing conventional frame synchronization techniques.

Figure 23:
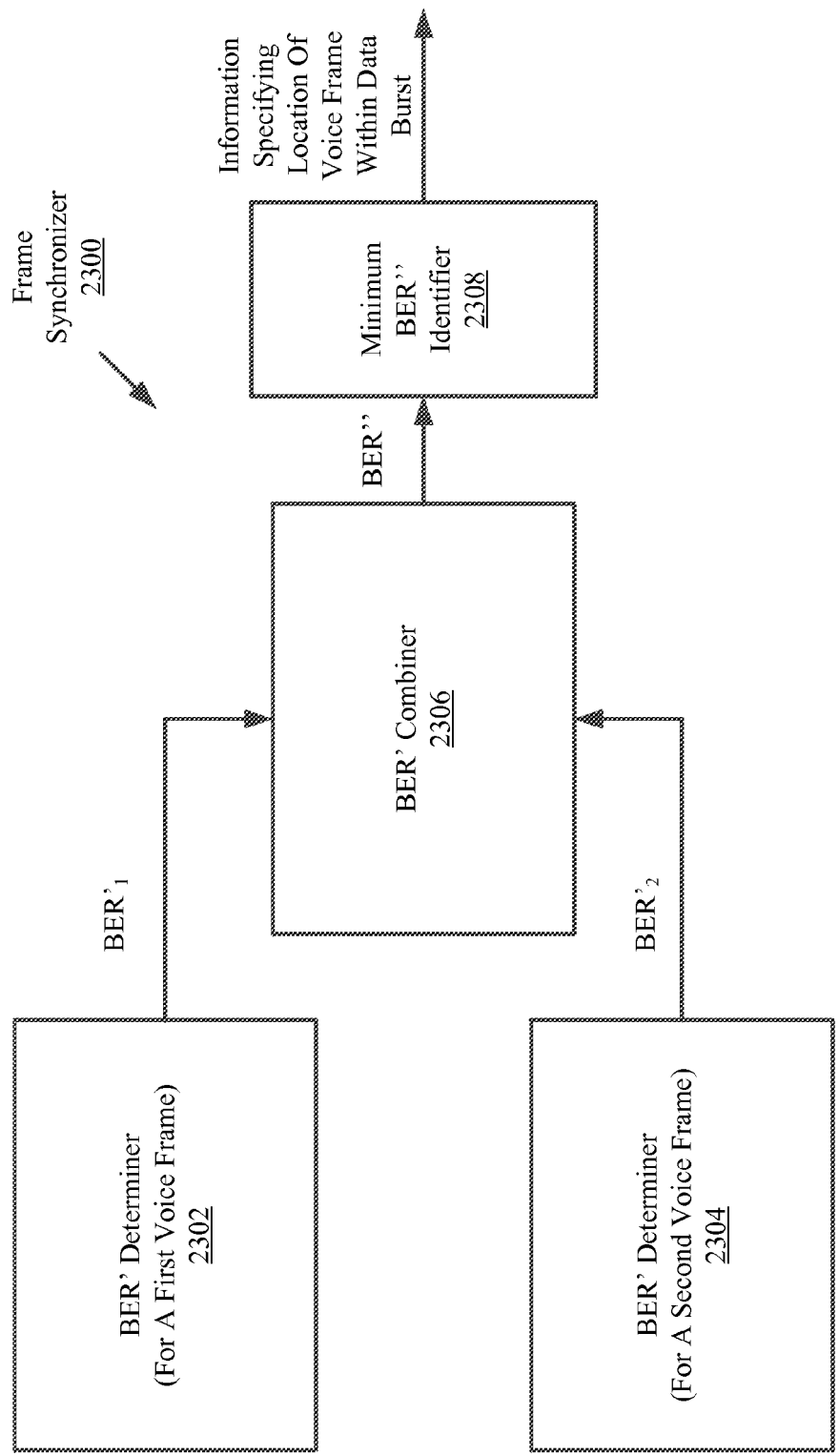
FIG. 23 is a block diagram of an exemplary frame synchronizer that is useful for understanding the present invention.

Referring now to FIG. 23, there is provided a block diagram of another exemplary frame synchronizer 2300 that is useful for understanding the present invention. The frame synchronizaer 2300 is generally configured to simultaneously or concurrently determine the locations of first and second vocoder voice frames within a data burst. As such, the frame synchronizer 2300 implements the concepts described above in relation to FIG. 21 and the method described above in relation to FIG. 22.

As shown in FIG. 23, the frame synchronizer 2300 comprises BER' determiners 2302, 2304, BER' combiner 2306 and a minimum BER" identifier 2308. Each of the BER' determiners 2302, 2304 includes components (not shown) which are the same as or substantially similar to the components 1904-1912 of FIG. 19. As such, the description of components 1904-1912 provided above is sufficient for understanding the operations of the BER' determiners 2302, 2304. The BER' combiner 2306 is configured to combine respective BERs' output from the BER' determiners 2302, 2304. The combining is achieved by adding the respective BERs' together; or averaging the respective BERs'. The result of the combining is referred to here as a combined BER' estimate or BER". BER" is then passed from the BER' combiner 2306 to the minimum BER" identifier 2308. The minimum BER" identifier 2308 identifies the lowest BER" from a plurality of combined BER' estimates. Thereafter, the lowest BER" is used to determine the start bits and end bits of the first and second vocoder voice frames within the data burst.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for frame synchronization between a transmitting device and a receiving device, comprising:
   extracting, by an electronic circuit, two different bit sequences from a bit stream of a data burst received by the electronic circuit, where a first bit sequence of the two different bit sequences comprises a plurality of first bits of the bit stream that is different than a plurality of second bits of the bit stream, where the plurality of second bits is contained in a second bit sequence of the two different bit sequences;
   decoding, by the electronic circuit, the two different bit sequences to obtain two decoded bit sequences;
   using, by the electronic circuit, a first decoded bit sequence from the two decoded bit sequences to determine a first Bit Error Rate ("BER") estimate for a vocoder voice frame;
   using, by the electronic circuit, a second decoded bit sequence from the two decoded bit sequences to determine a second BER estimate for the vocoder voice frame;
   combining, by the electronic circuit, the first and second BER estimates to obtain a first combined BER estimate;
   generating, by the electronic circuit, a third bit sequence by modifying the first bit sequence of the two different bit sequences so that the first bit sequence includes at least one bit of the bit stream which is not included in the plurality of first bits and so that the first bit sequence is absent of at least one of the plurality of first bits;
   generating, by the electronic circuit, a fourth bit sequence by modifying the second bit sequence of the two different bit sequences so that the second bit sequence includes at least one bit of the bit stream which is not included in the plurality of second bits and so that the second bit sequence is absent of at least one of the plurality of second bits;
   repeating the decoding, using, and combining steps by the electronic circuit to obtain a second combined BER estimate for the third and fourth bit sequences;
   analyzing, by the electronic circuit, the first combined BER estimate and the second combined BER estimate to identify a minimum combined BER estimate therefrom; and
   using, by the electronic circuit, the minimum combined BER estimate to determine a location of the vocoder voice frame within the data burst.

2. The method according to claim 1, wherein the first BER estimate is determined by:
comparing, by the electronic circuit, the first bit sequence with the respective one of the two decoded bit sequences to identify bit values of the first bit sequence which were changed during a decoding process; and
counting, by the electronic circuit, the number of bit values which were changed during the decoding process.

3. The method according to claim 2, wherein the first BER estimate is further determined by dividing the number of bit values by a total number of bits contained in the first bit sequence.

4. The method according to claim 1, wherein the first combined BER estimate is obtained by adding the first and second BER estimates together.

5. The method according to claim 1, wherein the first combined BER estimate is obtained by computing an average of the first and second BER estimates.

6. The method according to claim 1, wherein the minimum combined BER estimate is identified by selecting a combined BER estimate with a relatively low value from the first combined BER estimate and the second combined BER estimate.

7. The method according to claim 1, wherein the minimum combined BER estimate is identified by selecting, from the first combined BER estimate and the second combined BER estimate, a combined BER estimate that has a value less than a threshold value.

8. The method according to claim 7, wherein the threshold is selected to maximize a probability of detection of a correct location of the vocoder voice frame within the data burst and minimize a probability of a false detection of the correct location of the vocoder voice frame.

9. The method according to claim 7, wherein the bit stream of the data burst is discarded if none of the first combined BER estimate and the second combined BER estimate has a value that is less than the threshold.

10. The method according to claim 1, wherein a start bit of the vocoder voice frame comprises a bit contained in the first bit sequence and wherein an end bit of the vocoder voice frame comprises a bit contained in the second bit sequence.

11. A system for frame synchronization between a transmitting device and a receiving device, comprising:
at least one electronic circuit configured to
extract two different bit sequences from a bit stream of a received data burst, where a first bit sequence of the two different bit sequences comprises a plurality of first bits of the bit stream that is different than a plurality of second bits of the bit stream, where the plurality of second bits is contained in a second bit sequence of the two different bit sequences;
decode the two different bit sequences to obtain two decoded bit sequences;
use a first decoded bit sequence from the two decoded bit sequence to determine a first Bit Error Rate ("BER") estimate for a vocoder voice frame;
use a second decoded bit sequence from the two decoded bit sequence to determine a second BER estimate for the vocoder voice frame; and
combine the first and second BER estimates to obtain a first combined BER estimate;
generate a third bit sequence by modifying the first bit sequence from the two different bit sequences so that the first bit sequence includes at least one bit of the bit stream which is not included in the plurality of first bits and so that the first bit sequence is absent of at least one of the plurality of first bits;
generate a fourth bit sequence by modifying the second bit sequence of the two different bit sequences so that the second bit sequence includes at least one bit of the bit stream which is not included in the plurality of second bits and so that the second bit sequence is absent of at least one of the plurality of second bits;
repeat the decoding, using, and combining steps to obtain a second combined BER estimate for the third and fourth bit sequences;
analyze the first combined BER estimate and the second combined BER estimate to identify a minimum combined BER estimate therefrom; and
use the minimum combined BER estimate to determine a location of the vocoder voice frame within the data burst.

12. The system according to claim 11, wherein the first BER estimate is determined by:
comparing the first bit sequence with the respective one of the two decoded bit sequences to identify bit values of the first bit sequence which were changed during a previous decoding process; and
counting the number of bit values which were changed during the previous decoding process.

13. The system according to claim 12, wherein the first BER estimate is further determined by dividing the number of bit values by a total number of bits contained in the first bit sequence.

14. The system according to claim 11, wherein the first combined BER estimate is the sum of the first and second BER estimates together.

15. The system according to claim 11, wherein the first combined BER estimate is an average of the first and second BER estimates.

16. The system according to claim 11, wherein the minimum combined BER estimate comprises a combined BER estimate with a relatively low value that is selected from the first combined BER estimate and the second combined BER estimate.

17. The system according to claim 11, wherein the minimum combined BER estimate comprises a combined BER estimate which has a value less than a threshold value and is selected from the first combined BER estimate and the plurality of second combined BER estimates.

18. The system according to claim 17, wherein the threshold is selected to maximize a probability of detection of a correct location of the vocoder voice frame within the data burst and minimize a probability of a false detection of the correct location of the vocoder voice frame.

19. The system according to claim 17, wherein the electronic circuit is further configured to discard the bit stream of the data burst if none of the first combined BER estimate and the second combined BER estimate has a value that is less than the threshold.

20. The system according to claim 11, wherein said electronic circuit is further configured to select a bit, contained in the first or second bit sequence, which is associated with the minimum combined BER estimate to be a start bit or an end bit of the vocoder voice frame.

21. A method for frame synchronization between a transmitting device and a receiving device, comprising:
determining, by an electronic circuit, a plurality of first combined Bit Error Rate ("BER") estimates for a first vocoder voice frame;
determining, by the electronic circuit, a plurality of second combined BER estimates for a second vocoder voice frame;

combining, by the electronic circuit, the plurality of first combined BER estimates with the plurality of second combined BER estimates to obtain a plurality of third combined BER estimates;

analyzing, by the electronic circuit, the third combined BER estimates to identify a lowest combined BER estimate therefrom; and using, by the electronic circuit, the lowest combined BER estimate to determine the locations of the first and second vocoder voice frames within a data burst received by the electronic circuit.

22. The method according to claim 21, wherein each of the plurality of first and second combined BER estimates is determined by extracting, by the electronic circuit, two different bit sequences from a bit stream of said data burst, where a first bit sequence of the two different bit sequences comprises a plurality of first bits of the bit stream that is different than a plurality of second bits of the bit stream, where the plurality of second bits is contained in a second bit sequence of the two different bit sequences, decoding, by the electronic circuit, the two different bit sequences to obtain two decoded bit sequences, using, by the electronic circuit, a first decoded bit sequence from the two decoded bit sequences-to determine a first BER estimate for a respective one of the first and second vocoder voice frames, using, by the electronic circuit, a second decoded bit sequence from the two decoded bit sequences to determine a second BER estimate for the respective one of the first and second vocoder voice frames, and combining, by the electronic circuit, the first and second BER estimates to obtain a combined BER estimate of the plurality of first or second combined BER estimates.

* * * * *